US011089295B2

(12) United States Patent
Heo

(10) Patent No.: US 11,089,295 B2
(45) Date of Patent: Aug. 10, 2021

(54) DISPLAY APPARATUS, APPARATUS FOR PROOF OF PLAY, AND METHOD FOR PROOF OF PLAY OF CONTENTS

(71) Applicant: SAMSUNG ELECTRONICS CO., LTD., Suwon-si (KR)

(72) Inventor: Ju Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/763,135

(22) PCT Filed: Oct. 18, 2018

(86) PCT No.: PCT/KR2018/012356
§ 371 (c)(1),
(2) Date: May 11, 2020

(87) PCT Pub. No.: WO2019/093674
PCT Pub. Date: May 16, 2019

(65) Prior Publication Data
US 2020/0275091 A1 Aug. 27, 2020

(30) Foreign Application Priority Data

Nov. 10, 2017 (KR) ........................ 10-2017-0149386

(51) Int. Cl.
*H04N 17/00* (2006.01)
*G06T 7/11* (2017.01)
*G06K 9/62* (2006.01)

(52) U.S. Cl.
CPC ......... *H04N 17/004* (2013.01); *G06K 9/6202* (2013.01); *G06T 7/11* (2017.01)

(58) Field of Classification Search
CPC ............. H04N 21/812; H04N 2101/00; H04N 2201/0084; H04N 1/00244;
(Continued)

(56) References Cited

U.S. PATENT DOCUMENTS

| 6,984,039 B2 * | 1/2006 | Agostinelli .......... H04N 5/7416 348/E5.139 |
| 2013/0339992 A1 * | 12/2013 | Oki ...................... H04N 21/812 725/22 |

FOREIGN PATENT DOCUMENTS

| KR | 10-2002-0039304 A | 5/2002 |
| KR | 10-2003-0039854 A | 5/2003 |

(Continued)

OTHER PUBLICATIONS

International Search Report (PCT/ISA/210) dated Mar. 28, 2019 by the International Searching Authority in International Patent Application No. PCT/KR2018/012356.
(Continued)

*Primary Examiner* — Samira Monshi
(74) *Attorney, Agent, or Firm* — Sughrue Mion, PLLC

(57) ABSTRACT

Provided are a display apparatus, an apparatus for proof of play, and a method for proof of play of contents, to determine whether content is played normally by analyzing a captured image displayed on the display apparatus. A display apparatus according to an embodiment includes a display configured to display a content image; a communicator configured to receive a camera image captured by the display; and a controller configured to compare the content image and the camera image using a pixel value of the content image and a pixel value of the camera image, and determine whether the content image is displayed normally on the display based on the comparison result.

14 Claims, 19 Drawing Sheets

(58) Field of Classification Search
CPC ......... H04N 1/00347; H04N 21/44008; H04N 2201/0039; H04N 2201/0055; H04N 1/00204; H04N 1/00278; H04N 1/00442; H04N 1/0045; H04N 1/00453; H04N 1/00458; H04N 1/00461; H04N 1/00474; H04N 1/32363; H04N 21/41415; H04N 21/4722; H04N 2201/3288; H04N 2201/3295

See application file for complete search history.

(56) References Cited

FOREIGN PATENT DOCUMENTS

| | | |
|---|---|---|
| KR | 10-2005-0041496 A | 5/2005 |
| KR | 10-2006-0028467 A | 3/2006 |
| KR | 10-2011-0098239 A | 9/2011 |
| KR | 10-2015-0104022 A | 9/2015 |

OTHER PUBLICATIONS

Written Opinion (PCT/ISA/237) dated Mar. 28, 2019 by the International Searching Authority in International Patent Application No. PCT/KR2018/012356.

* cited by examiner

DISPLAY APPARATUS, APPARATUS FOR PROOF OF PLAY, AND METHOD FOR PROOF OF PLAY OF CONTENTS

TECHNICAL FIELD

Embodiments of the disclosure relate to a display apparatus, an apparatus for proof of play, and a method for proof of play of contents that can prove play of contents.

BACKGROUND ART

As a method of providing advertisements to potential consumers, there are a method of inserting advertisements into a broadcast signal and a method of playing advertisement images through a large format display (LFD) installed outdoors.

The first method is the method of inserting and playing an advertisement image between programs of airwave TV or cable TV, and can provide advertisements to consumers in any environment where TV can be viewed.

In the latter method, an advertisement image may be played through a large-sized display device (LFD) installed within a large floating population, such as a subway station, movie theater, bus stop, shopping mall, and the like, to provide advertisements to consumers around the display device.

When playing an advertisement video through a large display apparatus, it is difficult for an advertiser at a remote location to determine whether the advertisement video is properly played on the corresponding display apparatus because the advertisement video is played only on the designated display apparatus.

Therefore, there is a need for technology capable of confirming that an advertisement image is played normally according to pre-agreed conditions to an advertiser who has requested an advertisement to play on a large display device.

DISCLOSURE

Technical Problem

A display apparatus, an apparatus for proof of play, and a method for proof of play of contents, wherein video captured on a screen played on the display apparatus is automatically analyzed to determine whether the content is playing normally.

Technical Solution

In accordance with an aspect of the disclosure, a display apparatus includes: a display configured to display a content image; a communicator configured to receive a camera image captured by the display; and a controller configured to compare the content image and the camera image using a pixel value of the content image and a pixel value of the camera image, and determine whether the content image is displayed normally on the display based on the comparison result.

The controller may obtain an average pixel value of the content image and an average pixel value of the camera image, and determine whether the content image is displayed normally on the display by comparing the average pixel value of the content image and the average pixel value of the camera image.

The controller may determine the content image is displayed normally on the display when an error between the average pixel value of the content image and the average pixel value of the camera image is within a predetermined error range.

The pixel value may be determined by a color space applied to the content image.

The controller may control the communicator to transmit at least one of information including a vertical synchronization signal, a network delay time, a frame interval, and a display processing time to a camera device capturing the camera image.

The controller may compare the content image displayed on the display with the received camera image in real time.

The display apparatus may further include an external light sensor measuring external light around the display apparatus.

The controller may remove the measured external light from the camera image, and compare the camera image from which the measured external light is removed and the content image.

The controller may remove the measured external light from the content image, and control to display the content image from which the measured external light is removed.

The display apparatus may further include a proximity sensor detecting an obstacle between the display apparatus and a camera device that captures the camera image.

The controller may control the communicator to transmit a signal for holding a picture to the camera device.

The controller may suspend a determination as to whether the content image is displayed normally on the display when the proximity sensor detects the obstacle.

The controller may control the display to display a segmented image for distinguishing a screen from a bezel.

The controller may recognize a segmented image from the camera image, and determine a screen area based on the recognized segmented image.

The controller may extract the screen area from the received camera image when the display displaying the content image received the captured camera image.

The display apparatus may further include a storage configured to store the content image together with a playback time of the content image.

The controller may compare the camera image with the content image having a corresponding playback time to a capturing time of the camera image.

In accordance with an embodiment, an apparatus for proof of play includes a memory configured to store a camera image when the camera image captured a screen displaying a content image and the content image are input, and a processor configured to compare the content image and the camera image using a pixel value of the content image and a pixel value of the camera image, and determine whether the content image is displayed normally based on the comparison result.

The processor may acquire an average pixel value of the content image and an average pixel value of the camera image, and may determine whether the content image is displayed normally on the display by comparing the average pixel value of the content image and the average pixel value of the camera image.

The processor may compare the displayed content image and the received camera image in real time.

The memory may further store a playback time of the content image, and the processor may compare the camera image with the content image having a corresponding playback time to a capturing time of the camera image.

In accordance with an aspect of the embodiment, a method for proof of play of contents comprises: acquiring a camera image captured a screen displaying a content image; comparing the content image and the camera image using a pixel value of the content image and a pixel value of the camera image; and determining whether the content image is displayed normally based on the comparison result.

The comparing the content image and the camera image may include obtaining an average pixel value of the content image and an average pixel value of the camera image, and comparing the average pixel value of the content image and the average pixel value of the camera image.

The determining whether the content image is displayed normally may include determining the content image is displayed normally on the display when an error between the average pixel value of the content image and the average pixel value of the camera image is within a predetermined error range.

The comparing the content image and the camera image may include removing measured external light from the camera image, and comparing the camera image from which the measured external light is removed and the content image.

Advantageous Effects

According to a display apparatus, a server, and a method for proof of play of contents according to an embodiment, it is possible to automatically determine whether content is being played normally by analyzing an image captured on a screen played on a large display apparatus.

MODE FOR INVENTION

Figure 1:
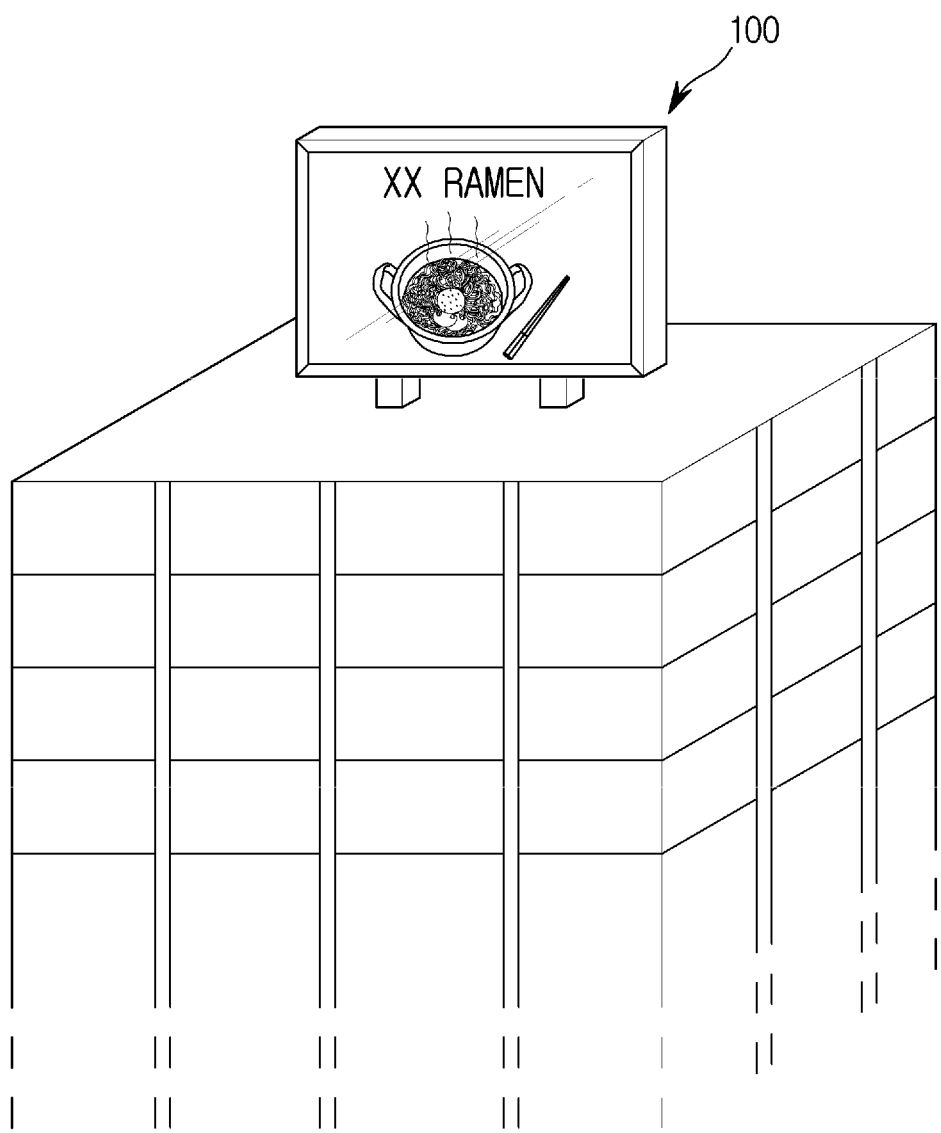
FIGS. 1 and 2 are views schematically showing the appearance of a display apparatus according to an embodiment.

In the following description, like reference numerals refer to like elements throughout the specification. This specification does not describe all elements of the embodiments, and in the technical field to which the present invention pertains, there is no overlap between the general contents or the embodiments.

It will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

An expression used in the singular form encompasses the expression of the plural form, unless it has a clearly different meaning in the context.

Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

Hereinafter, embodiments of the present disclosure will be described with reference to the accompanying drawings.

Figure 2:
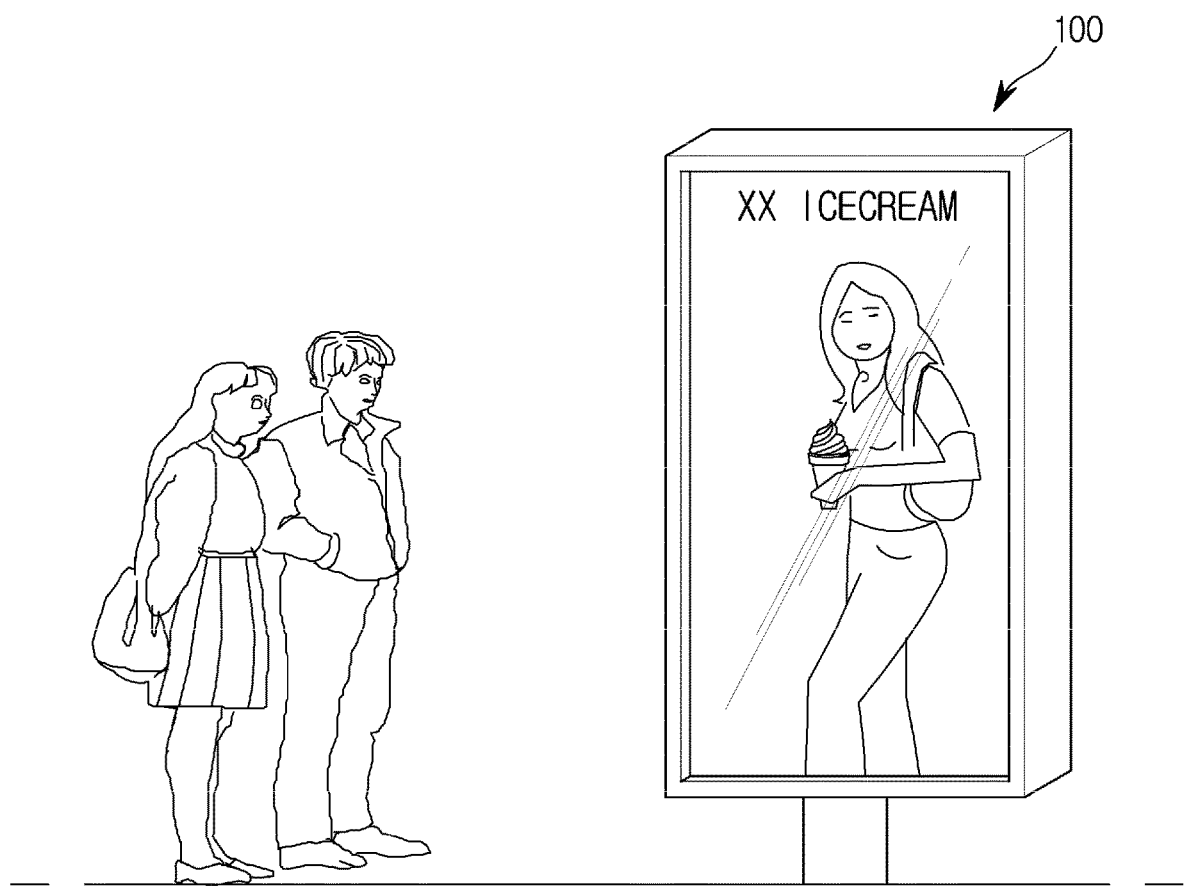
Figure 3:
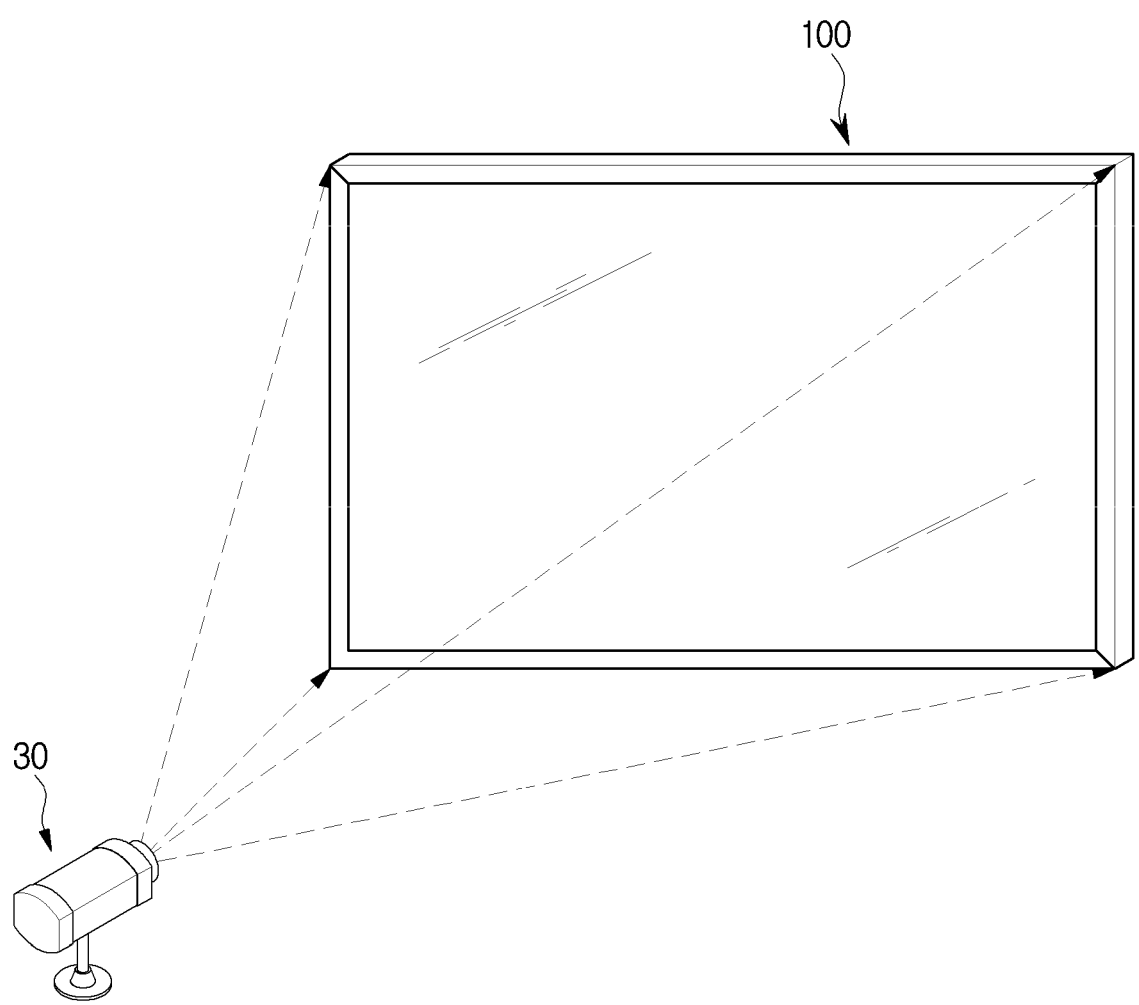
FIG. 3 is a view showing a camera capturing a display apparatus according to an embodiment.

FIGS. 1 and 2 are views schematically showing the appearance of a display apparatus according to an embodiment, and FIG. 3 is a view showing a camera capturing a display apparatus according to an embodiment.

Referring to FIGS. 1 and 2, a display apparatus 100 according to an embodiment may be a large display apparatus installed outdoors, such as a roof of a building or a bus stop. Here, the outdoors is not necessarily limited to the outdoors. The display apparatus 100 according to an embodiment may be installed indoors, such as a subway station, a shopping mall, a movie theater, a company, a shop, etc.

The display apparatus 100 may play content images provided by advertisers. For example, an owner or manager of the display apparatus 100 may play a content image provided by the advertiser at a specific time through a contract with the advertiser. In this case, since the content image provided by the advertiser is played only on the display apparatus 100 at a specific location, means are required for the remote advertiser to check whether the content image is played normally on the display apparatus 100 according to pre-agreed conditions.

Accordingly, as illustrated in FIG. 3, the display apparatus 100 may be captured with a camera apparatus 30 and it may be determined whether to play the content image using the captured image.

In the past, a person directly monitored captured video to determine whether to play a content video, but this is inefficient in terms of cost, time, and accuracy. The display apparatus 100 according to an embodiment may automatically analyze an image captured by the camera apparatus 30 to determine whether to play the content image.

Figure 4:
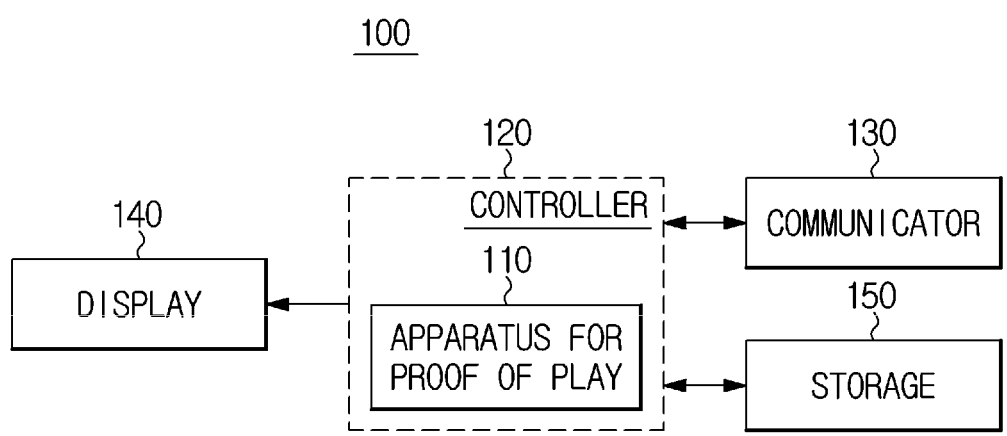
FIG. 4 illustrates a control block diagram of a display apparatus according to an embodiment.
Figure 5:
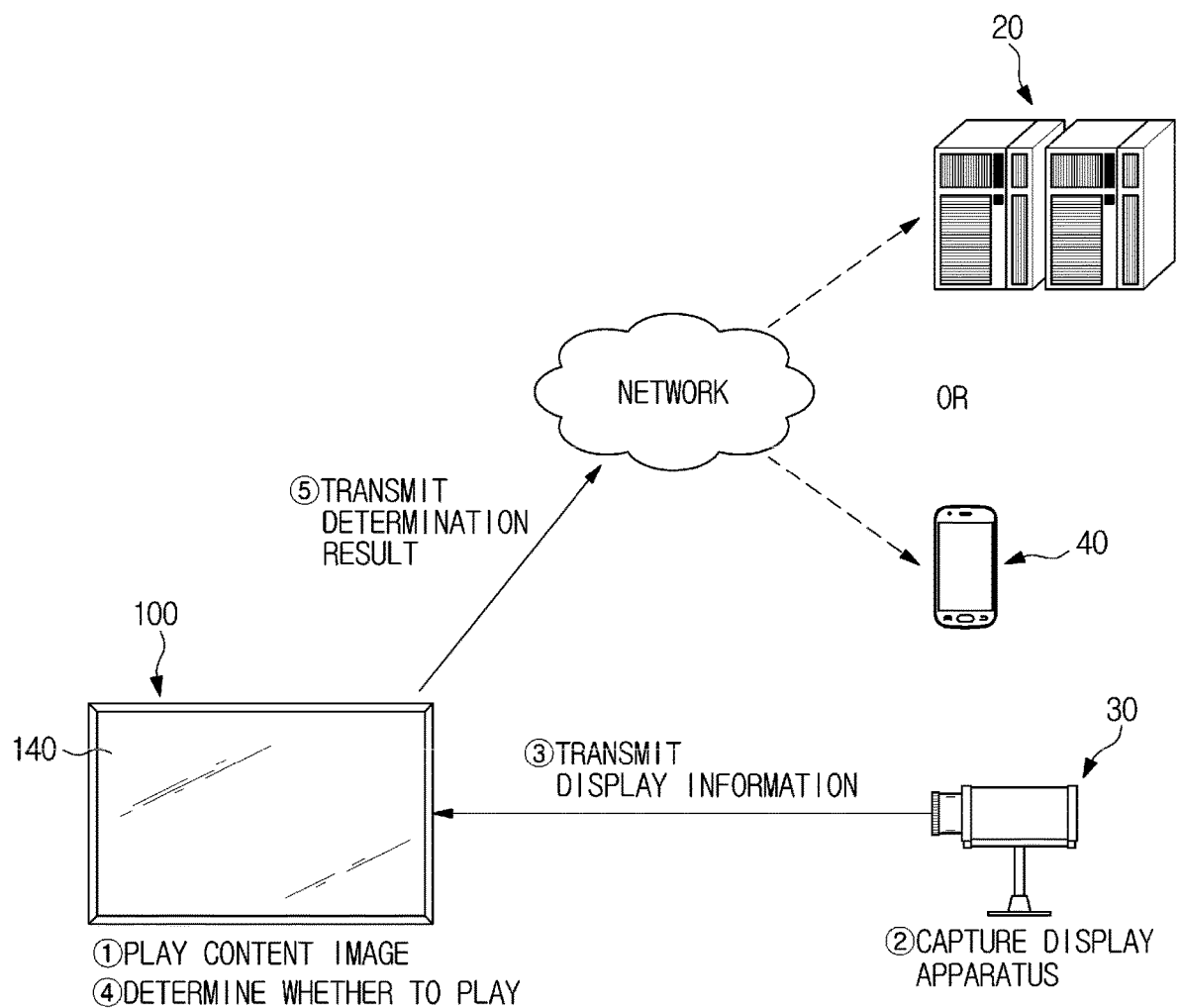
FIG. 5 is a diagram illustrating an example of information exchanged between a display apparatus and a camera apparatus according to an embodiment.

FIG. 4 illustrates a control block diagram of a display apparatus according to an embodiment, and FIG. 5 is a diagram illustrating an example of information exchanged between a display apparatus and a camera apparatus according to an embodiment.

Referring to FIG. 4, the display apparatus 100 includes a communicator 130, a storage 150, a display 140, and an apparatus for proof of play 110.

The communicator 130 may receive an image to be played on the display apparatus 100 and a camera image in which the display apparatus 100 is captured.

The image to be played on the display apparatus 100 may be input from a separate play device such as a computer or DVD player. Alternatively, it may be input through a wireless communication network, or may be input from a recording medium such as a USB.

The camera apparatus 30 may transmit the camera image taken by the display apparatus 100 to the display apparatus 100 through wireless communication or wired communication.

Accordingly, the communicator 130 may include at least one of an interface that is connected to a recording medium or a play device and receives data, and a communication module that performs wireless communication or wired communication with an external device.

The communicator 130 may include at least one of a wireless communication module and a short-range communication module.

The wireless communication module may include at least one of various wireless communication modules that can be connected to an Internet network such as Wi-Fi, Wireless broadband, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), 4th generation mobile communication, 5th generation mobile communication, etc.

The short-range communication module may include at least one of various short-range communication modules such as a Bluetooth module, an infrared communication module, a radio frequency identification (RFID) communication module, a wireless local access network (WLAN) communication module, an NFC communication module, and a Zigbee communication module.

In addition, the communicator 130 may include an interface such as a USB port through which a USB connector is inserted, and a cable port through which a cable such as HDMI connected to a play device is inserted.

The image input to the display apparatus 100 through the communicator 130 may be a content image. In this embodiment, the content image may be an image including content for advertisement, broadcasting, guidance, public relations, and the like. For example, the content image may be an advertisement image provided by the advertiser through a contract with the advertiser. In this embodiment, the content included in the content image is not limited.

The storage 150 may store the content image and camera image input through the communicator 130 temporarily or non-temporarily.

The storage 150 may include a non-volatile memory in which stored data is preserved even when the power is cut off. For example, the storage 150 may include at least one storage media such as read only memory (ROM), erasable programmable ROM (EPROM), electrically erasable programmable ROM (EPMROM), flash memory, hard disk drive, and optical disk drive.

In addition, the storage 150 may further include a volatile memory in which stored data is deleted when the power is cut off. For example, the storage 150 may include at least one RAM such as Dynamic Random Access Memory (DRAM) and Static Random Access Memory (SRAM).

The display 140 may display content images input from play devices connected to the display apparatus 100. Alternatively, a predetermined content image may be displayed at a predetermined time according to a time schedule stored in the storage 150.

The display 140 may employ a variety of display panels, such as a liquid crystal display (LCD) panel, a plasma display panel (PDP), a light emitting diode (LED) display panel, an organic light emitting diode (OLED) display panel, and a quantum dot light emitting diode (QLED) display panel. In this embodiment, the type of panel employed by the display 140 is not limited.

When the camera apparatus 30 captures the display apparatus 100 and transmits it to the communicator 130, the apparatus for proof of play 110 may determine whether the content image is played normally by using the image received by the communicator 130. In the embodiment of the disclosed invention, that the content image is played normally may mean that the content image being played on the display apparatus 100 and a play screen shown in the image captured by the camera apparatus 30 match. If the content image being played on the display apparatus 100 and the play screen shown in the image captured by the camera apparatus 30 do not match, the apparatus for proof of play 110 may determine that the content image is not played normally, and therefore, a user can confirm that the display apparatus 100 has a defect.

Alternatively, that the content image is played normally may mean that the specified content image is played at a predetermined time. The detailed operation of the apparatus for proof of play 110 will be described later.

The apparatus for proof of play 110 may include at least one memory in which programs for performing the operations described above and operations described below are stored, and at least one processor for executing the stored programs. For example, at least one memory may store content images and camera images that are compared with each other, temporarily or non-temporarily, and at least one processor may compare a pixel value of the content image and a pixel value of the camera image according to the contents described below.

The controller 120 may control the overall operation of the display apparatus 100, and may include the apparatus for proof of play 110.

The controller 120 may include at least one memory in which a program for performing an operation described below is stored, and at least one processor for executing a stored program.

The memory and processor used to perform the operation of the apparatus for proof of play 110 may be used to perform other operations of the controller 120, or the memory and processor used to perform the operation of the apparatus for proof of play 110 may be provided separately from the memory and processor used to perform other operations of the controller 120. It is also possible that the apparatus for proof of play 110 or the controller 120 shares the memory with the storage 150.

The controller 120 can play the content image input from the play device or stored in the storage 150. When the controller 120 performs display processing on the content image and transmits it to the display 140, the display 140 may display the content image on which the display processing has been performed. In this embodiment, play of the content image and display of the content image may be used in the same sense.

As shown in FIG. 5, the controller 120 plays a content image ① and displays the content image on which the display 140 is played.

The camera apparatus 30 ② captures the display apparatus 100. As shown in FIG. 3 described above, the camera apparatus 30 is disposed at a position facing the front of the display apparatus 100, so that a screen displayed on the display 140 can be captured. In an embodiment described later, a screen displayed on the display 140 as an image is played is referred to as a play screen, and an image captured by the camera apparatus 30 is referred to as a camera image.

The camera apparatus ③ transmits the camera image obtained by capturing the play screen of the display apparatus 100 to the display apparatus 100. The communicator 130 of the display apparatus 100 receives the camera image, and the apparatus for proof of play 110 compares the content image with the camera image, therefore, ④ the camera apparatus 30 may automatically determine whether the content video is played normally. The above-described processes ① to ④ may be performed every frame constituting the content image, or may be performed every frame at a predetermined time interval.

⑤ The determination result can be transmitted to a management server 20 or a user terminal 40 through the wireless network.

Figure 6:
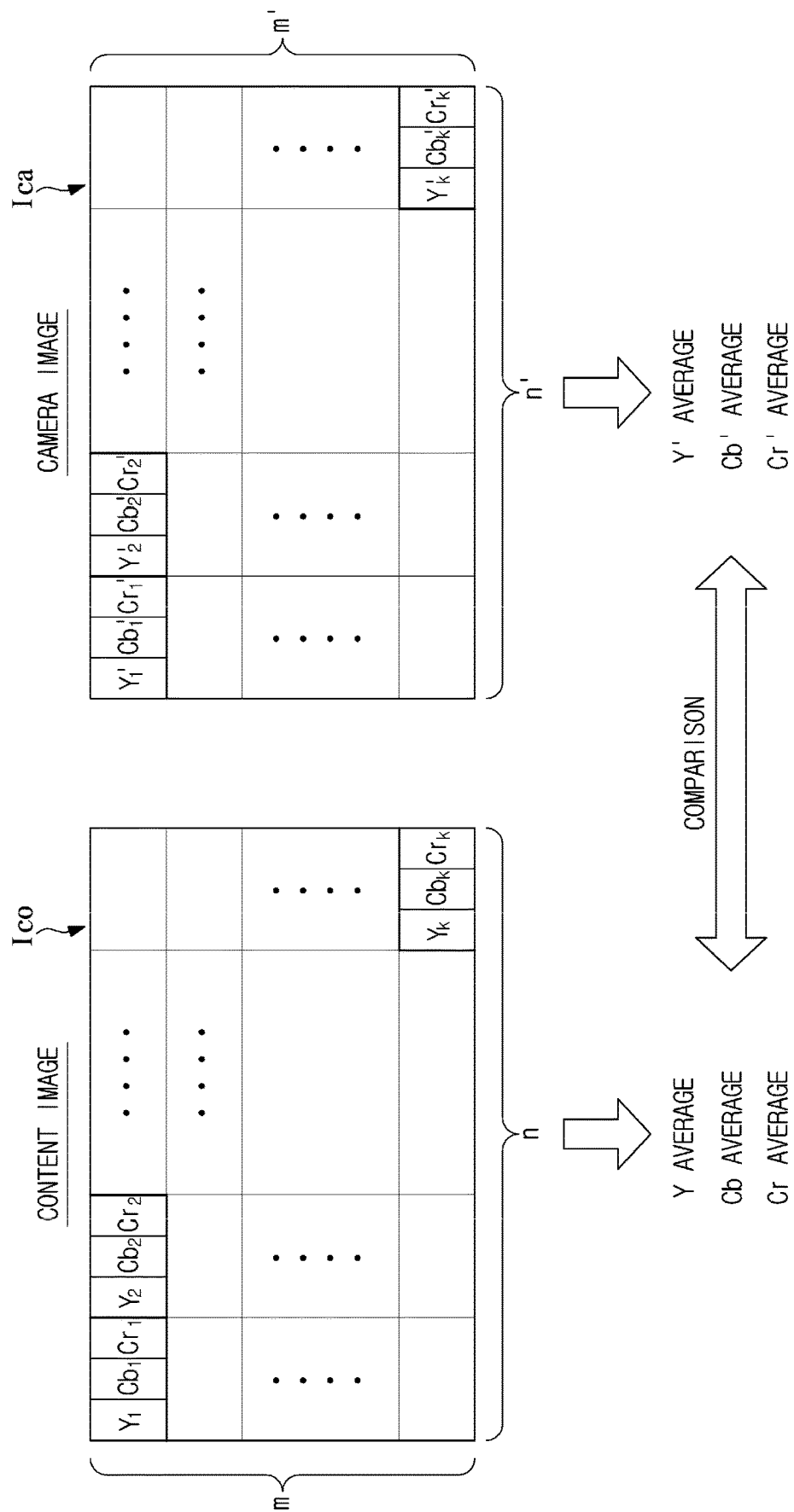
FIG. 6 is a diagram illustrating an example of a method for a display apparatus to compare a content image and a camera image according to an embodiment.

FIG. 6 is a diagram illustrating an example of a method for a display apparatus to compare a content image and a camera image according to an embodiment.

The apparatus for proof of play 110 may determine whether to play the content image by comparing the pixel value of the content image with the pixel value of the camera image.

For example, as illustrated in FIG. 6, when a content image $I_{co}$ has a pixel structure of m×n (m, n is an integer of 2 or more), the apparatus for proof of play 110 may calculate color values of m×n (=k) total pixels, that is, averages of the pixel values.

The color value of each pixel may be changed according to a color space applied to the content image $I_{co}$. The color space applied to the content image $I_{co}$ may be at least one of various color spaces such as RGB color space, YCbCr color space, HSV color space, CMYK color space, CIE color space, and YIQ color space.

For example, when the YCbCr color space is applied to the content image, each of the m×n (=k) pixels constituting the content image $I_{co}$ has a Y value, a Cb value, and a Cr value. The average of the Y values for all pixels (Yavg) can be expressed by [Equation 1] below, the average of the Cb values (Cbavg) can be expressed by the following [Equation 2], and the average of the Cr values (Cravg) can be expressed by [Equation 3] below.

$$Y\_avg = \frac{(Y\_1 + Y\_2 + \ldots + Y\_k)}{k} \quad \text{[Equation 1]}$$

$$Cb\_avg = \frac{(Cb\_1 + Cb\_2 + \ldots + Cb\_k)}{k} \quad \text{[Equation 2]}$$

$$Cr\_avg = \frac{(Cr\_1 + Cr\_2 + \ldots + Cr\_k)}{k} \quad \text{[Equation 3]}$$

The apparatus for proof of play 110 can calculate the average of the color values of all pixels for a camera image $I_{ca}$ in the same manner.

The average of the Y values for the camera image $I_{ca}$ is called Y'avg, the average of the Cb values is called Cb'avg, and the average of the Cr values is called Cr'avg. The apparatus for proof of play 110 may determine whether to play the content image by comparing Yavg and Y'avg, comparing Cbavg and Cb'avg, and comparing Cravg and Cr'avg.

For example, in the apparatus for proof of play 110, when the error between the average of the Y values for the content image Yavg and the average of the Y values for the camera image Y'avg is within a predetermined error range, the error between the average of the Cb values for the content image Cbavg and the average of the Cb values for the camera image Cb'avg is within a predetermined error range, and the error of the average of the Cr value for the content image Cravg and the average of the Cr value for the camera image Cr'avg is within a predetermined error range, then it can be determined that the content image is played normally.

Meanwhile, the pixel structure m×n of the content image and a pixel structure m'×n' of the camera image may be different from each other (m=m', n=n'). However, since the apparatus for proof of play 110 uses the average of pixel values, it is possible to compare each other even when the pixel structures of the two images are different.

When the content image is a video, the content image may be composed of a plurality of frame images. When the content image is a video, the apparatus for proof of play 110 may perform comparison of the pixel values as described above every frame, or may be performed for every frame of a predetermined time interval.

When the pixel values are compared for a plurality of frames constituting one content image, if the comparison result for all the frames is included in the error range, it may be determined that the content image is played normally, or if a comparison result for a frame having a predetermined ratio or more is included in the error range, it may be determined that the content image is played normally.

The two images in which the pixel values are compared may be content images currently being played on the display apparatus 100 and camera images currently captured in the camera apparatus 30. At this time, a display time of the content image and the capturing time of the camera image may be synchronized.

For example, the controller 120 may transmit a V-sync signal, a network delay time, a frame interval, and a display processing time to the camera apparatus 30 through the communicator 130. Here, the display processing time represents the time until the screen is output normally after transmitting data including the V-sync signal from the display apparatus 100.

The camera apparatus 30 may synchronize the output of the screen on the display apparatus 100 and the time of capturing of the camera apparatus 30 based on the transmitted V-sync signal, the network delay time, the frame interval, and the display processing time.

When network latency is equal to or greater than the frame interval, while several frames are displayed on the display apparatus 100, without capturing a play screen, the communication network of the display apparatus 100 and the camera apparatus 30 may be waited until normalization.

In addition, when the display processing time is greater than the network delay time, the camera apparatus 30 may wait for the difference between the display processing time and the network delay time and capture the display apparatus 100 after the play screen is output from the display apparatus 100.

Comparison of pixel values may also be performed in real time, and frames of the camera images corresponding to each frame of the played content image are stored in correspondence, and the comparison of the content image and the camera image may be performed later.

Meanwhile, the apparatus for proof of play 110 may determine whether a predetermined content image is played at a predetermined time. In this case, when the camera apparatus 30 transmits a camera image, it may transmit information on a shooting time of the camera image together. The apparatus for proof of play 110 may compare a content image having a play time corresponding to the capturing time of the camera image with the camera image. Here, the content image having the play time corresponding to the capturing time of the camera image means a content image determined to be played at the capturing time of the camera image, and information on the play time of the content image is stored in the storage 150 as a time schedule. In this case, the storage 150 may store the content image and the time schedule of the content image, and the content image and its time schedule may be provided through a play device or a wireless network.

Figure 7:
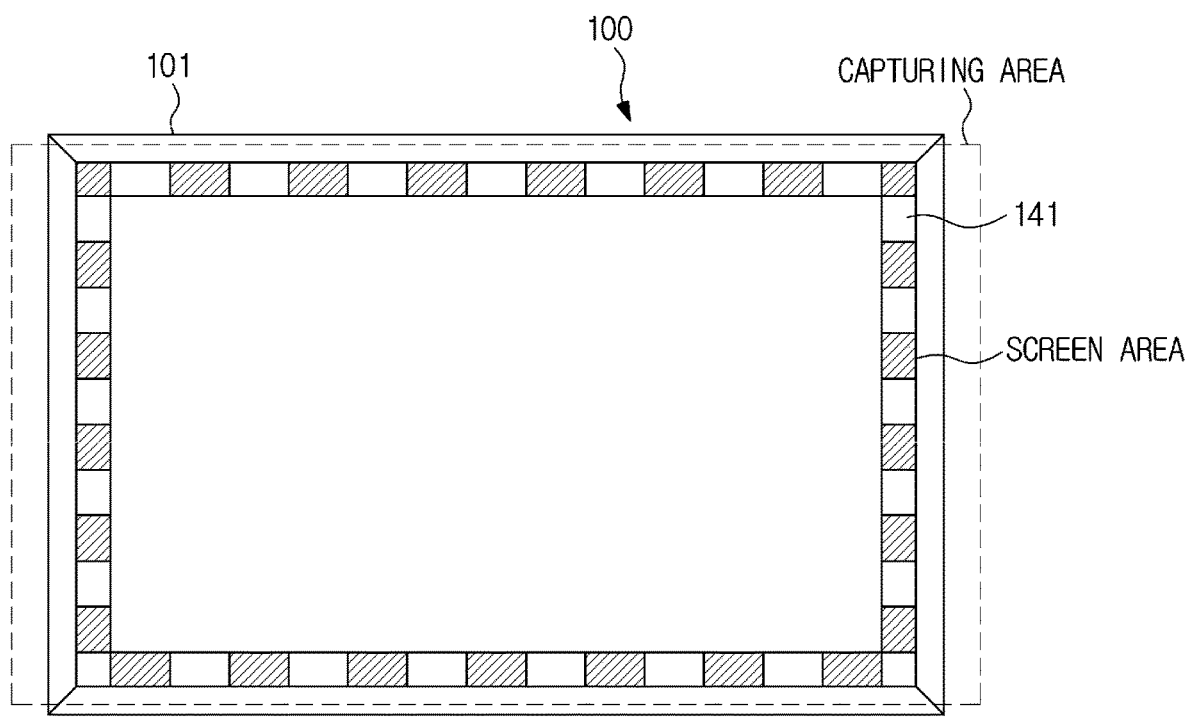
FIG. 7 is a diagram illustrating an example of a segmented image displayed on a display apparatus according to an embodiment.

FIG. 7 is a diagram illustrating an example of a segmented image displayed on a display apparatus according to an embodiment.

Depending on parameters such as relative positions of the camera apparatus 30 and the display apparatus 100, angle of view of the camera apparatus 30, and the like, a case in which a part other than the play screen is included in the camera image may occur. For example, as illustrated in FIG. 7, a case in which a bezel 101 of the display apparatus 100 is included in addition to the play screen may occur in a capturing area of the camera apparatus 30.

Accordingly, the display apparatus 100 may display a segmented image 141 for distinguishing the play screen from the bezel 101 before playing the content image. As illustrated in FIG. 7, a specific pattern may be displayed only on a boundary between the screen and the bezel 101, or certain patterns may be displayed on the entire screen, or a specific color distinct from the bezel 101 may be displayed on the boundary between the screen and the bezel 101 or the entire screen.

When the display apparatus 100 displays the classified image 141, the camera apparatus 30 captures the display apparatus 100 and transmits the camera image to the display apparatus 100.

The apparatus for proof of play 110 recognizes the specific pattern or color included in the segmented image 141 in the camera image. Information about the segmented image 141 may be stored in advance in the storage 150.

The apparatus for proof of play 110 may determine a region (hereinafter referred to as 'screen region') corresponding to the screen in the camera image by recognizing the specific pattern or the specific color included in the segmented image 141. The apparatus for proof of play 110 may store information on the location of the screen area in the camera image, and when the camera image in which the content image is captured is transmitted from the camera apparatus 30, the screen area is extracted from the camera image, and may perform comparison between the pixel values described above with respect to the extracted screen area.

Alternatively, it is also possible for the user to manually designate the screen area in the camera image. In this case, the camera image on which the segmented image 141 is captured may be displayed on the display 140 and the screen area may be designated using an input device provided in the display apparatus 100. Alternatively, it is also possible for the user to specify the screen area in the camera apparatus 30.

The extraction of the screen area may be performed when the display apparatus 100 and the camera apparatus 30 are installed, and may be performed whenever the installation positions of the camera apparatus 30 are changed. In addition, it is also possible to perform periodically even if the installation position of the camera apparatus 30 or the display apparatus 100 is not changed.

Figure 8:
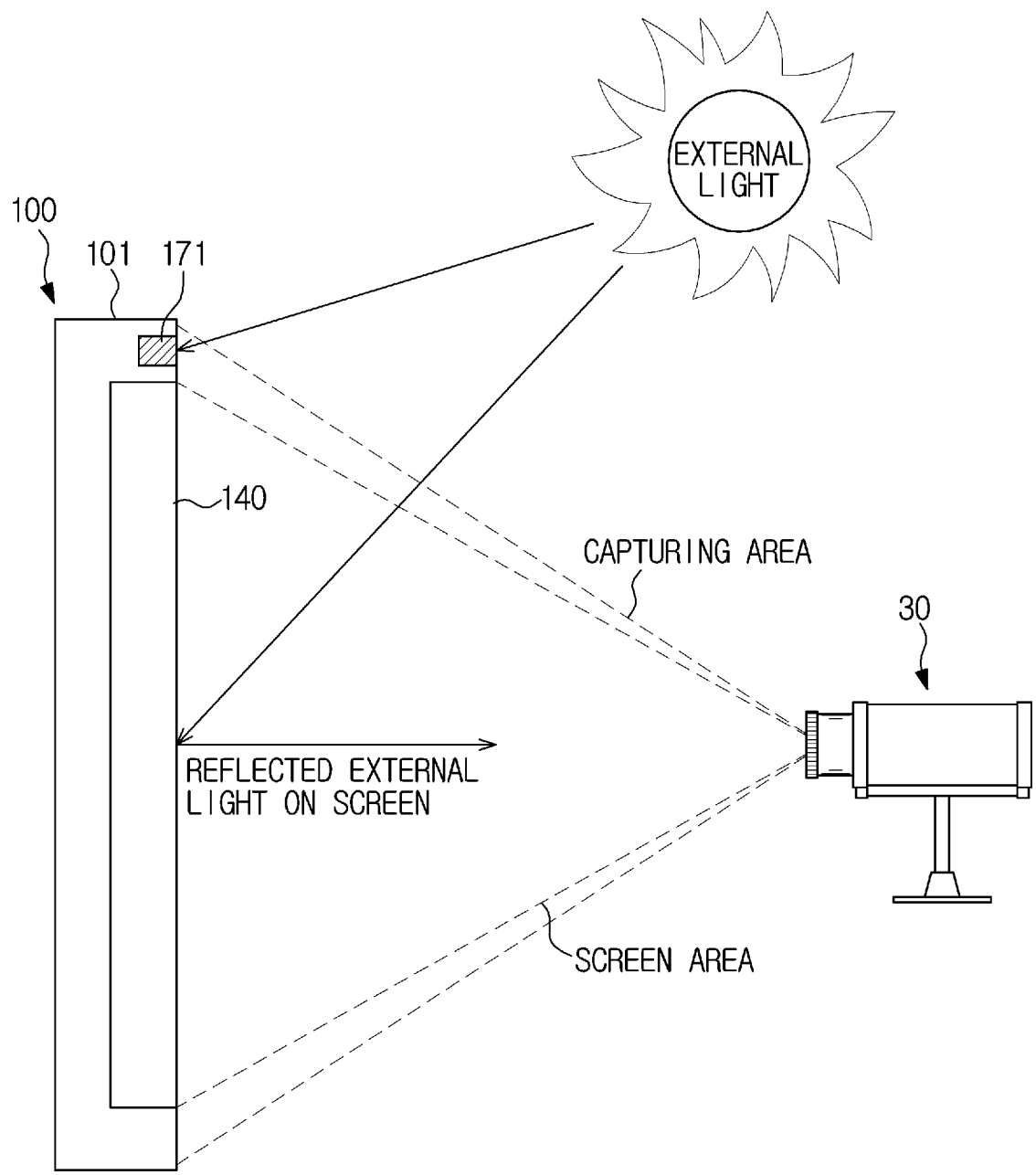
FIG. 8 is a control block diagram of a display apparatus further including an external light sensor.
Figure 9:
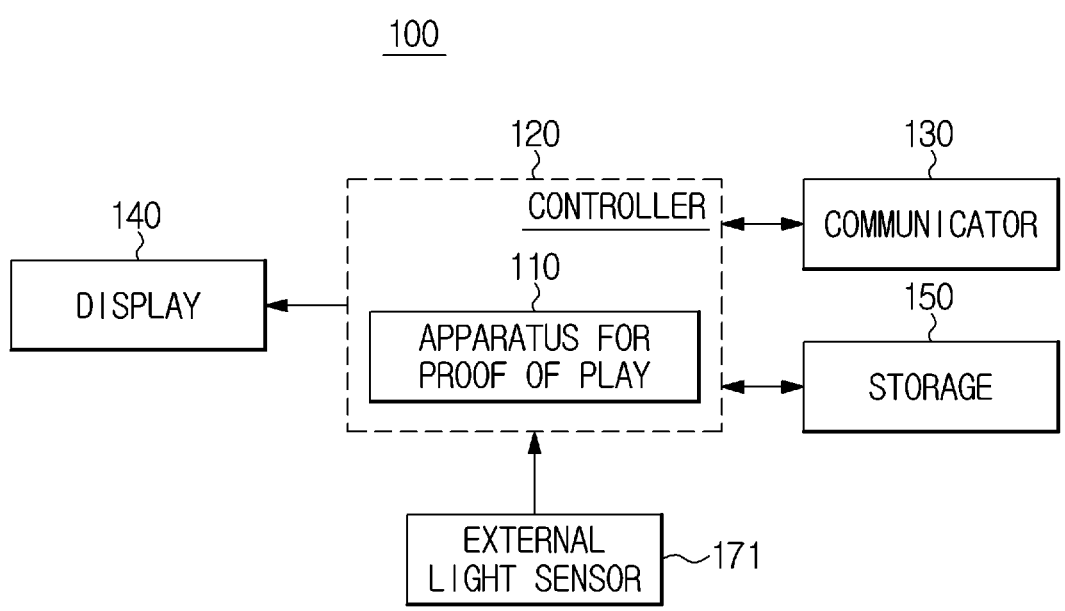
FIG. 9 is a view showing the appearance of a display apparatus further comprising an external light sensor.

FIG. 8 is a control block diagram of a display apparatus further including an external light sensor. FIG. 9 is a view showing the appearance of a display apparatus further comprising an external light sensor.

Referring to FIGS. 8 and 9, the display apparatus 100 may further include an external light sensor 171 for measuring external light, and the external light sensor 171 may be provided in a region of the display apparatus 100. For example, the external light sensor 171 may be installed in one area of the bezel 101.

Whether the display apparatus 100 is installed outdoors or indoors, external light may exist around the display apparatus 100, and when the external light exists, the camera apparatus 30 captures the play screen reflecting the influence of the external light.

The display apparatus 100 may measure the external light using the external light sensor 171 and remove the influence of the external light from the camera image transmitted from the camera apparatus 30 to compare it with the content image. Alternatively, it is also possible to remove the influence of the external light by lowering and outputting the pixel value of the content image displayed on the display 140 by the measured color value of the external light.

The external light sensor 171 may include a color sensor. When the external light sensor 171 outputs the color value of the external light, the apparatus for proof of play 110 may remove the influence of the external light by comparing the two images by subtracting the color value of the external light from the camera image or adding the color value of the external light to the content image.

For example, when the external light sensor 171 outputs the color value of the external light as an RGB value, the apparatus for proof of play 110 may subtract the RGB value of the external light from the pixel value of the camera image. If the color space applied to the camera image is not an RGB color space, two color spaces can be matched through color space conversion.

In the example of FIG. 9, the case where one of the external light sensors 171 is provided is exemplified, but it is needless to say that a plurality of the external light sensors 171 may be provided. When the plurality of external light sensors 171 are provided, the color values output from the plurality of external light sensors 171 may be combined to be used as the color values of the external light. For example, a weight may be assigned according to the position of each of the external light sensors 171, and a weighted average may be performed to combine the color values.

The location where the external light sensor 171 is installed is also not limited to the example of FIG. 9, and the external light sensor 171 may be installed at various positions such as an edge, a left side, a right side, and a lower portion of the bezel 101.

Figure 10:
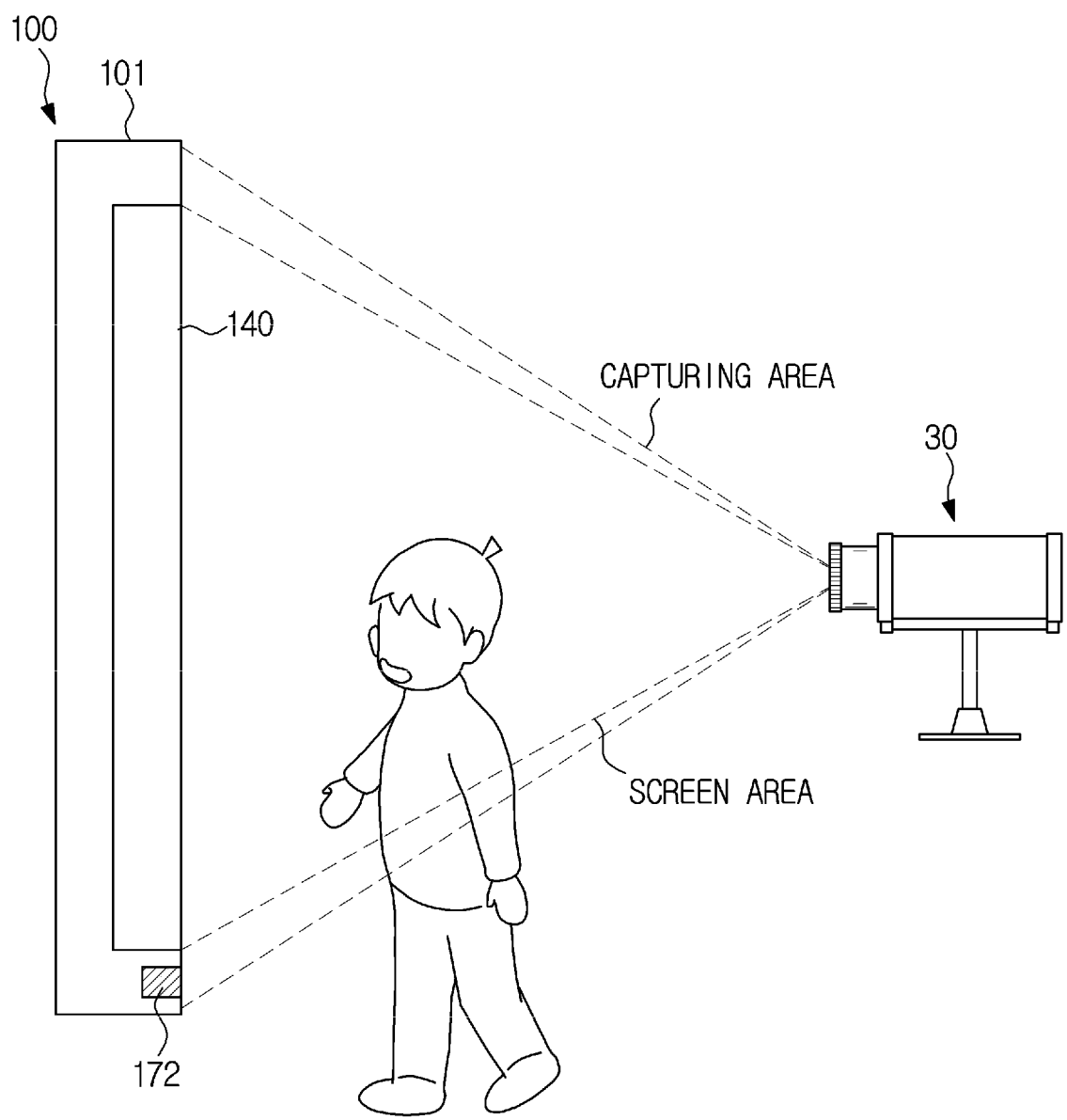
FIG. 10 is a control block diagram of a display apparatus further including a proximity sensor.
Figure 11:
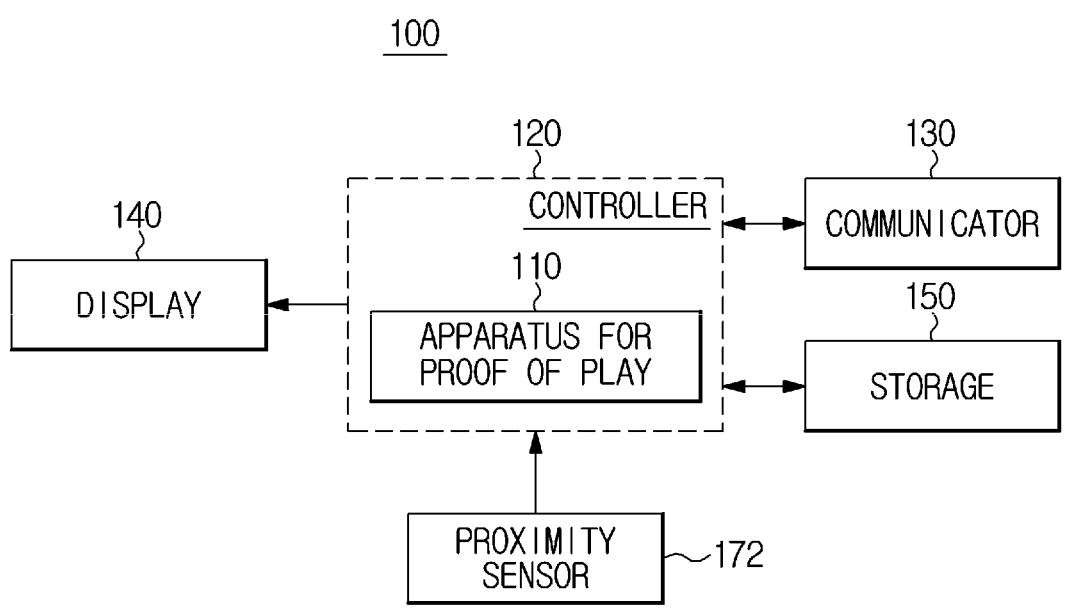
FIG. 11 is a view showing the appearance of a display apparatus further including a proximity sensor.

FIG. 10 is a control block diagram of a display apparatus further including a proximity sensor. FIG. 11 is a view showing the appearance of a display apparatus further including a proximity sensor.

Referring to FIGS. 10 and 11, the display apparatus 100 may further include a proximity sensor 172 detecting an obstacle between the display apparatus 100 and the camera apparatus 30, and the proximity sensor 172 may be provided in an area of the display apparatus 100. For example, the proximity sensor 172 may be installed in an area of the bezel 101.

The proximity sensor 172 may include at least one sensor capable of detecting obstacles such as an ultrasonic sensor, an infrared sensor, and an optical sensor.

When an obstacle exists, such as a person passing between the display apparatus 100 and the camera apparatus 30, the camera image captured by the camera apparatus 30 includes other obstacles in addition to the play screen of the display apparatus 100, and the obstacle may cover the play screen.

Therefore, when the proximity sensor 172 detects an obstacle, it transmits an obstacle detection signal to the apparatus for proof of play 110, and the apparatus for proof of play 110 may suspend the determination of play through comparison of the camera image and the content image.

Alternatively, the proximity sensor 172 may transmit an obstacle detection signal to the controller 120, and the controller 120 may control the communicator 130 to transmit a hold signal to the camera apparatus 30.

As described above, when an obstacle exists between the display apparatus 100 and the camera apparatus 30, the determination of whether to play the content image is suspended, thereby preventing the result of an erroneous determination and reducing unnecessary arithmetic operations.

The controller 120 may control the communicator 130 and transmit the determination result of whether to play the content image of the apparatus for proof of play 110 to the management server 20 managing the display apparatus 100 or the user terminal 40. At this time, an ID identifying the display apparatus 100 may be transmitted together. The management server 20 or the user terminal 40 receiving the result of determining whether to play together with the ID of the display apparatus 100 may check whether the content image is played normally. Alternatively, it may be determined whether a specific content image has been played on a predetermined display apparatus at a predetermined time.

The management server 20 is an apparatus for managing a plurality of the display apparatuses 100 collectively, and can store and manage a plurality of the content images played in the plurality of display apparatuses 100 and information about their time schedule.

The management server 20 may check whether the display apparatus 100 is defective based on the result of determining whether to play the content image. For example, when the content image being played on the display apparatus 100 and the camera image taken by the camera apparatus 30 do not match, it is determined that a defect has occurred in the display apparatus 100 and appropriate measures can be taken.

In addition, the management server 20 may transmit the result of determining whether to play the content image transmitted from the display apparatus 100 to the user terminal 40 corresponding to the content image. For example, the user terminal 40 corresponding to the content image may be a terminal of the advertiser that provided the content image. The management server 20 may store information of the user terminal 40 corresponding to each of the content images in advance.

Alternatively, the display apparatus 100 may transmit the result of determining whether to play directly to the user terminal 40 corresponding to the content image. In this case, the storage 150 may match and store information in the user terminal 40 corresponding to each of the content images.

In the above-described embodiment, the case where the display apparatus 100 determines whether to play the content image has been described. According to another embodiment, it is also possible that the management server is provided with a play determination device for determining whether to play the content image. Hereinafter, an embodiment of the management server for determining whether to play the content image will be described.

Figure 12:
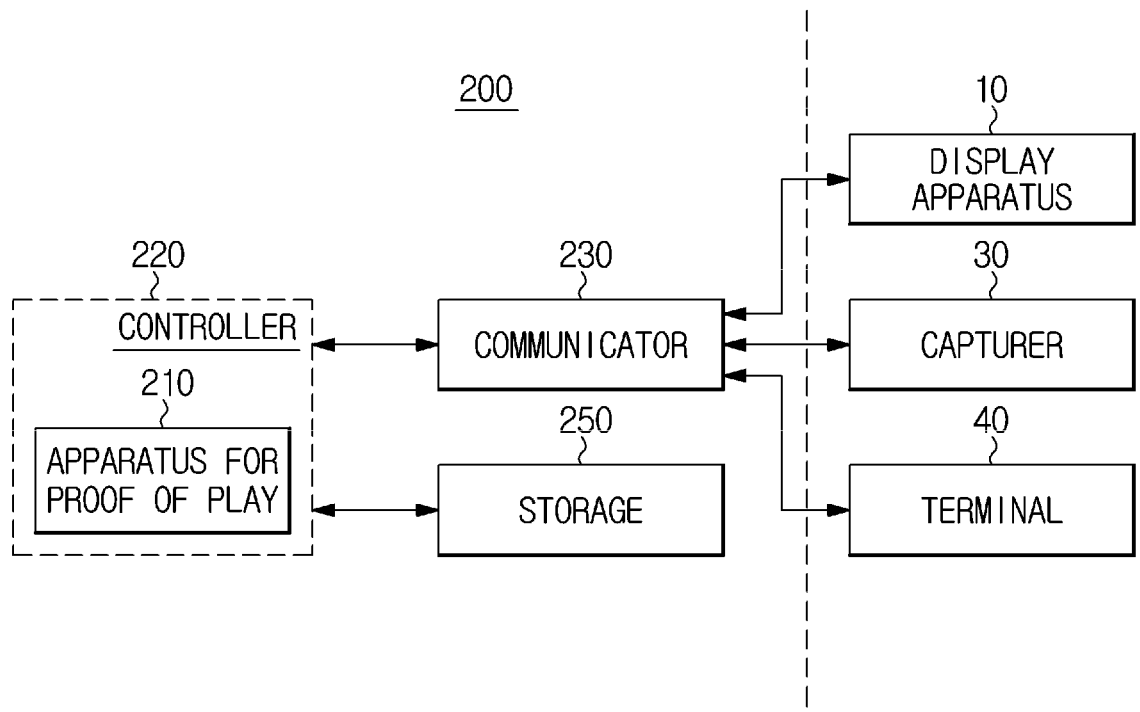
FIG. 12 is a control block diagram of a management server according to an embodiment.
Figure 13:
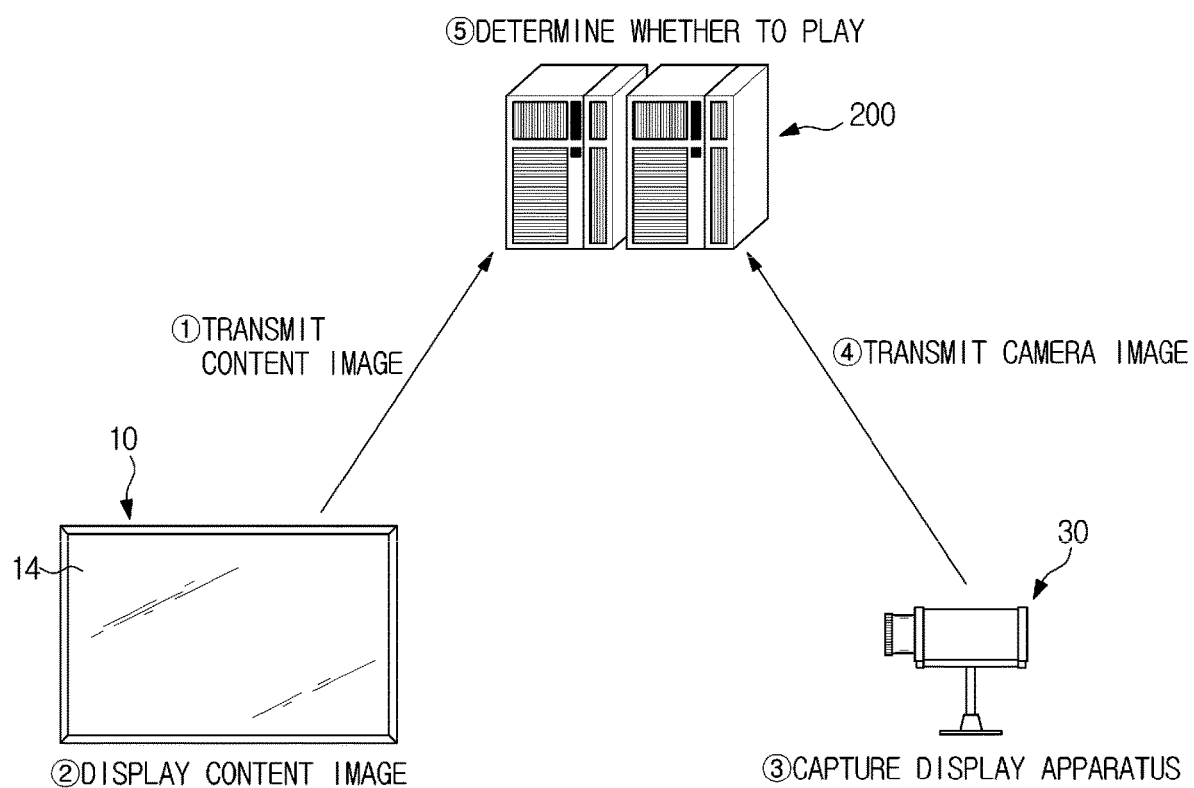
FIG. 13 is a diagram illustrating an example of information received from a camera apparatus by a management server according to an embodiment.

FIG. 12 is a control block diagram of a management server according to an embodiment, and FIG. 13 is a diagram illustrating an example of information received from a camera apparatus by a management server according to an embodiment.

Referring to FIG. 12, a management server 200 includes a communicator 230, a storage 250, and an apparatus for proof of play 210.

The communicator 230 may receive a content image displayed on a display apparatus 10 and a camera image taken by the display apparatus 10. The description of the camera image is the same as in the above-described embodiment. The display apparatus 10 in this embodiment may include the display apparatus 100 described above.

The communicator 230 may include a wireless communication module. The description of the wireless communication module is also omitted because it is the same as in the above-described embodiment.

The apparatus for proof of play 210 may compare the camera image with the content image to determine whether the content image is played normally. Alternatively, it is possible to determine whether a predetermined content image is played on a predetermined display apparatus at a predetermined time.

The apparatus for proof of play 210 may include at least one memory in which programs for performing the operations described above and operations described below are stored, and at least one processor for executing the stored programs.

The controller 220 may control the overall operation of the management server 200 and may include the apparatus for proof of play 210.

The controller 220 may include at least one memory in which a program for performing an operation described below is stored, and at least one processor for executing a stored program.

The memory and processor used to perform the operation of the apparatus for proof of play 210 may be used to perform other operations of the controller 220, or the memory and processor used to perform the operation of the apparatus for proof of play 210 may be provided separately from the memory and processor used to perform other operations of the controller 220. It is also possible for the controller 220 or the apparatus for proof of play 210 to share the memory with the storage 250.

The storage 250 may store information about the display apparatus 10 (ID, installation location, etc.) and information about the camera apparatus 30 (ID, installation location, etc.).

As shown in FIG. 13, the display apparatus 10 ① transmits the content image to be displayed to the management server 20, and ② displays the content image on a display 14. It is possible to simultaneously transmit and display the content images, and it is also possible to change the order. When the content image is transmitted, the display apparatus 10 may transmit its ID. In addition, the display apparatus 10 may transmit the content image as it is, and it is also possible to calculate and transmit an average of pixel values for each frame described above.

The camera apparatus 30 captures the ③ display apparatus 10. As described with reference to FIG. 3, the camera apparatus 30 is disposed at a position facing the front surface of the display apparatus 10 to capture the play screen displayed on the display 14.

The camera apparatus 30 may ④ transmit the camera image obtained by photographing the play screen of the display apparatus 10 to the management server 200. The camera apparatus 30 may transmit the camera image together with its own ID, and may also transmit the camera image together with the shooting time of the camera image according to an embodiment.

The communicator 230 of the management server 200 receives the content image and the camera image, and the apparatus for proof of play 210 compares the content image and the camera image to automatically ⑤ determine whether the content image is played normally. The content image and the camera image that the apparatus for proof of play 210 compares are transmitted from the display apparatus 10 and the camera apparatus 30 having the IDs corresponding to each other. For example, the ID of the display apparatus 10 may be stored in the storage 250 in correspondence with the ID of the camera apparatus 30 photographing the display apparatus 10. Alternatively, when the display apparatus 10 or the camera apparatus 30 transmits the content image or the camera image, it is also possible to transmit the ID of the corresponding camera apparatus 30 or the ID of the display apparatus 10 together.

The description of the operation of the apparatus for proof of play 210 comparing the content image and the camera image is the same as that of the apparatus for proof of play 110.

Even if the management server 200 determines whether to play the content as in the embodiment, the display apparatus 10 may transmit a V-sync signal, a frame interval, a display processing time, etc. to the camera apparatus 30, and the display apparatus 10 may capture the camera image in synchronization with the screen output of the display apparatus 10 based on the transmitted information.

The result of the determination as to whether or not to play the content image may be transmitted to the user terminal 40, or an appropriate action such as repair of the device may be performed based on the determination result. For example, when it is determined that the content image is not played normally, the controller 220 may provide information regarding the location of the display apparatus 10 stored in the storage 250 to an administrator, and the administrator may take measures such as repairing the corresponding display apparatus 10.

The above-described processes ① to ④ may be performed every frame constituting the content image, or may be performed every frame at a predetermined time interval.

Meanwhile, the display apparatus 10 may include the external light sensor 171 or the proximity sensor 172 previously described in the embodiment of the display apparatus 100. In this case, the display apparatus 10 may transmit the output of the external light sensor 171 or the output of the proximity sensor 172 to the camera apparatus 30 or the management server 200.

For example, the display apparatus 10 may transmit the output of the external light sensor 171 to the management server 200, and the apparatus for proof of play 210 of the management server 200 reflects the output of the external light sensor 171 when comparing the content image and the camera image, therefore the influence of external light on the camera image can be eliminated.

In addition, when the display apparatus 10 transmits the output of the proximity sensor 172 to the camera apparatus 30, when there is an obstacle between the display apparatus 10 and the camera apparatus 30, the camera apparatus 30 may hold the capturing of the screen.

In addition, when the display apparatus 10 transmits the output of the proximity sensor 172 to the management server 200, when the apparatus for proof of play 210 has an obstacle between the display apparatus 10 and the camera apparatus 30, the captured camera image may not be used to determine whether to play the content.

Alternatively, the storage 250 of the management server 200 pre-stores the content image, information on which of the display apparatuses 10 to play the content image, information about when to play (time schedule), and the like, and it is also possible to compare the camera image captured by the camera apparatus 30 with the pre-stored content image, and determine whether or not the predetermined content image has been played on the predetermined display apparatus 10 at a predetermined time. Hereinafter, it will be described in detail with reference to FIG. 14.

Figure 14:
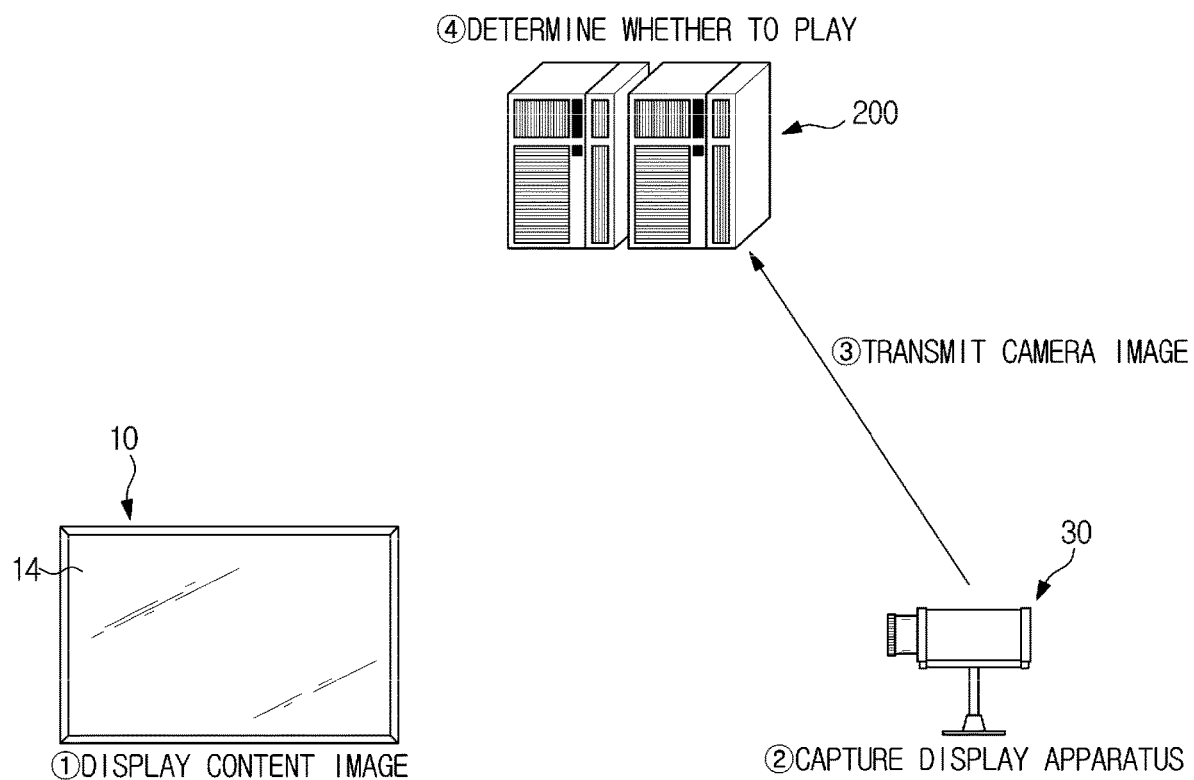
FIG. 14 is a diagram illustrating an example in which a management server according to an embodiment compares a previously stored content image with a camera image.

FIG. 14 is a diagram illustrating an example in which a management server according to an embodiment compares a previously stored content image with a camera image.

Referring to FIG. 14, the display apparatus 10 plays the content image, and ① displays the content image played on the display 14. A predetermined content image may be played on the display apparatus 10 at a predetermined time according to a time schedule.

The camera apparatus 30 ② captures the display apparatus 10. The camera apparatus 30 may capture the play screen displayed on the display 14.

The camera apparatus 30 may ③ transmit the camera image obtained by capturing the play screen of the display apparatus 100 to the management server 200, and at this time, the camera's image capturing time and its ID can be transmitted together.

The transmission of the camera image and the content image only needs to be performed before the management server 200 determines whether to play the content image, and there is no restriction on the transmission order. However, when it is determined in real time that the transmission and play of the camera image is made, it is assumed that the transmission of the content image is performed before the transmission of the camera image.

The communicator 230 of the management server 200 receives the camera image and the content image, and the apparatus for proof of play 210 compares the content image and the camera image ④ to automatically determine whether the predetermined content image is played on the predetermined display apparatus at the predetermined time.

In this case, the storage 250 may store the IDs of the corresponding display apparatus 10 for each of the display apparatuses 10 and the IDs of the camera apparatus 30 capturing the corresponding display apparatus 10 in correspondence with each other. In addition, the content images determined to be played on the display apparatus 10 for each of the display apparatuses 10 may be stored in correspondence with the time schedule for each of the content images.

Alternatively, when the camera apparatus 30 transmits the camera image, it is also possible to transmit the ID of the display apparatus 10 that it photographs together with its ID. In this case, even if the ID of the camera apparatus 30 is not stored in the storage 250 of the management server 200, the apparatus for proof of play 210 can search the ID of the display apparatus 10 transmitted with the ID of the camera apparatus 30 in the storage 250 to search for the required content image.

The operation of the apparatus for proof of play 210 comparing the content image and the camera image is the same as in the above-described embodiment. When the apparatus for proof of play 210 determines whether to play the content image, the controller 220 may transmit the result of determining whether to play to the user terminal 40 of the user corresponding to the content image.

In the above-described embodiments of FIGS. 12 to 14, a case has been described in which the management server determines whether to play the content image. According to another embodiment, it is also possible to provide the play determination device for determining whether to play the content image in the camera device. Hereinafter, an embodiment of a camera device for determining whether to play a content image will be described.

Figure 15:
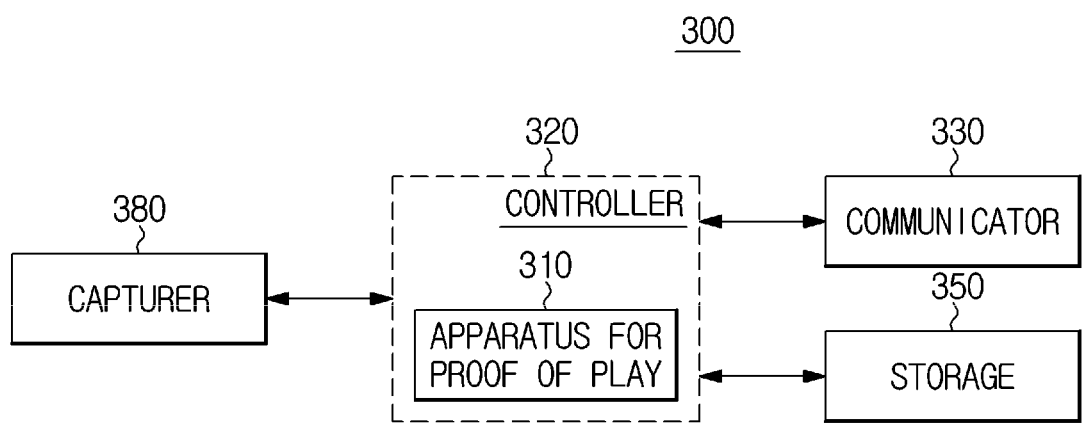
FIG. 15 is a control block diagram of a camera apparatus according to an embodiment.
Figure 16:
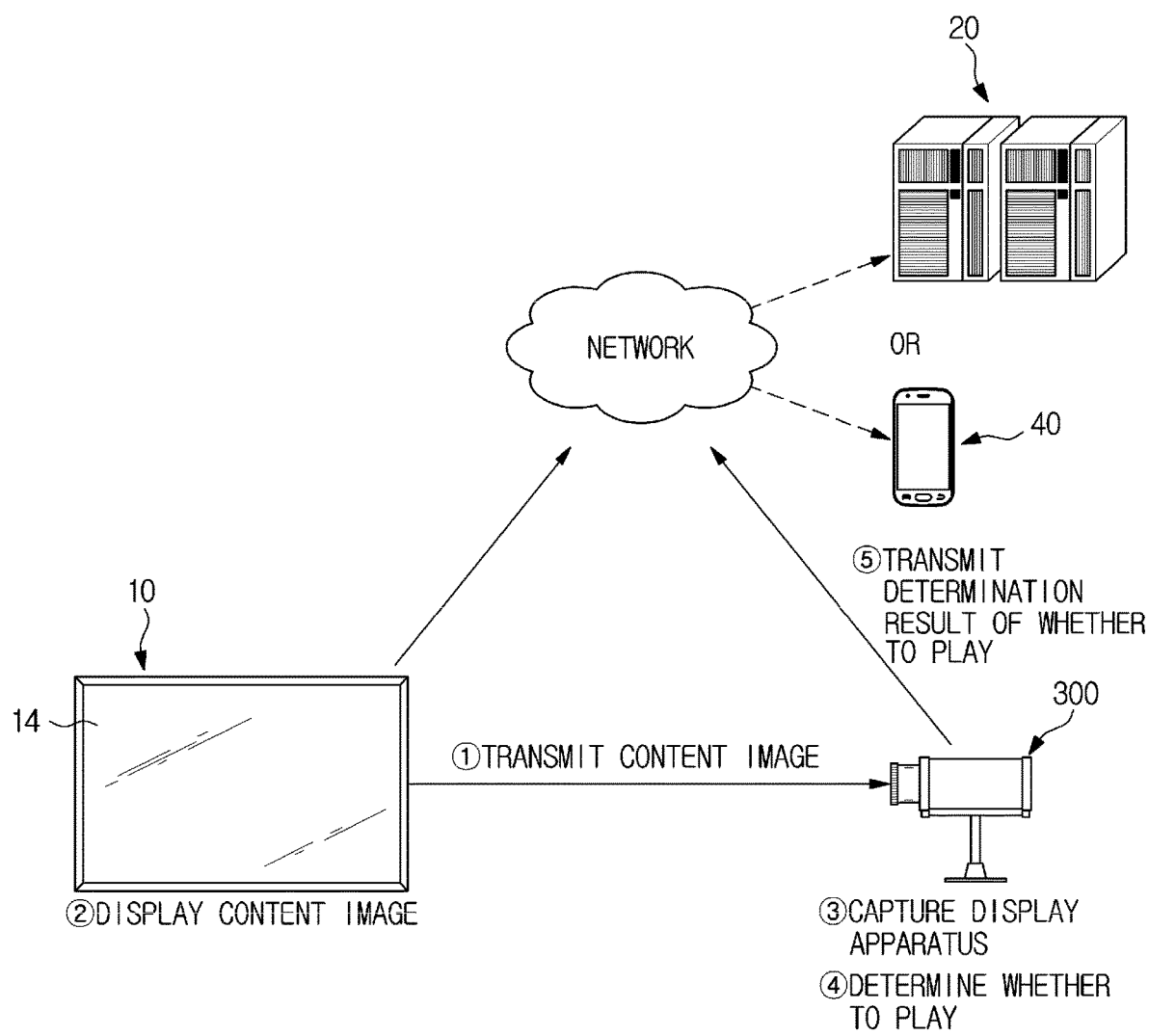
FIG. 16 is a diagram illustrating an example of information received from a display apparatus by a camera apparatus according to an embodiment.

FIG. 15 is a control block diagram of a camera apparatus according to an embodiment, and FIG. 16 is a diagram illustrating an example of information received from a display apparatus by a camera apparatus according to an embodiment.

Referring to FIG. 15, a camera apparatus 300 includes a capturer 380, a communicator 330, a storage 350 and an apparatus for proof of play 310.

The capturer 380 captures an image by employing an image sensor such as a CMOS image sensor and a CCD image sensor. The captured image is transmitted to the apparatus for proof of play 310.

The communicator 330 may receive information such as a content image, a V-sync signal, a frame interval, and a display processing time from the display apparatus 10.

The communicator 330 may include a wireless communication module. The description of the wireless communication module will be omitted because it is the same as in the above-described embodiment.

The apparatus for proof of play 310 may compare the camera image with the content image to determine whether the content image is played normally. Alternatively, it may be determined whether a predetermined content image is played on a predetermined display apparatus at a predetermined time.

The controller 320 may include at least one memory in which programs for performing the above-described operations and the operations described below are stored, and at least one processor for executing the stored programs.

The controller 320 may control the overall operation of the management server 200 and may include the apparatus for proof of play 310.

The controller 320 may include at least one memory in which a program for performing an operation described below is stored, and at least one processor for executing a stored program.

The memory and processor used to perform the operation of the apparatus for proof of play 310 may be used to perform other operations of the controller 320, or the memory and processor used to perform the operation of the apparatus for proof of play 310 may be provided separately from the memory and processor used to perform other operations of the controller 320. It is also possible for the controller 320 or the apparatus for proof of play 310 to share the memory with the storage 350.

The storage 350 may temporarily or non-temporarily store the result of determining whether to play the captured camera image and the content image.

Referring to FIG. 16, the display apparatus 10 ① transmits the content image to be displayed to the camera apparatus 30. At this time, a V-sync signal, a network delay time, a frame interval and a display processing time can also be transmitted.

The display apparatus 10 performs display processing on the content image, and ② displays the content image on the display 14. The displayed content image is an image on which the display processing is performed.

The capturer 380 of the camera apparatus 300 captures the ③ display apparatus 10. For example, the camera apparatus 30 can synchronize the output of the screen on the display apparatus 10 and the time of shooting of the camera apparatus 300 based on the transmitted V-sync signal, the network delay time, the frame interval, and the display processing time.

When the network delay time is equal to or larger than the frame interval, a few frames are displayed on the display apparatus 100 and the play screen is not captured. The communication network of the display apparatus 100 and the camera apparatus 30 may be waited until normalization.

In addition, when the display processing time is greater than the network delay time, the display apparatus 10 may be photographed after the play screen is output from the display apparatus 100 by waiting for the difference between the display processing time and the network delay time.

The apparatus for proof of play 310 compares the content image with the camera image, and ④ can automatically determine whether the content image is played normally.

It is also possible to compare pixel values in real time, and to store frames of the camera images corresponding to each frame of the transmitted content image, and to compare the content image and the camera image later.

When the content image is a video composed of a plurality of frames, the above-described processes ① to ④ may be performed every frame, or may be performed every frame having a predetermined time interval.

If the apparatus for proof of play 310 determines whether to play the content video, the communicator 330 may transmit the result of determining whether to play to the management server 20 or the user terminal 40 corresponding to the corresponding content image through the wireless network.

As described above, the management server 20 may store information of the user terminal 40 corresponding to each of the content images in advance. When the management server 20 receives the result of determining whether to play the content image from the camera apparatus 300, the result of determining whether to play may be transmitted to the user terminal 40 corresponding to the corresponding content image.

Alternatively, it is also possible to transmit the determination result directly to the user terminal 40 corresponding to the content image. In this case, the storage 350 may match and store information in the user terminal 40 corresponding to each of the content images.

Meanwhile, the display apparatus 10 may include the external light sensor 171 or the proximity sensor 172 previously described in the embodiment of the display apparatus 100. In this case, the display apparatus 10 may transmit the output of the external light sensor 171 or the output of the proximity sensor 172 to the camera apparatus 30 or the management server 200.

For example, the display apparatus 10 may transmit the output of the external light sensor 171 to the camera apparatus 300, and the apparatus for proof of play 210 of the camera apparatus 300 reflects the output of the external light sensor 171 when comparing the content image and the camera image, and thus the influence of external light on the camera image can be eliminated.

In addition, when the display apparatus 10 transmits the output of the proximity sensor 172 to the camera apparatus 30, when there is an obstacle between the display apparatus 10 and the camera apparatus 30, the camera apparatus 30 may hold the capturing of the screen.

In addition, when the display apparatus 10 transmits the output of the proximity sensor 172 to the camera apparatus 300, when the apparatus for proof of play 210 has an obstacle between the display apparatus 10 and the camera apparatus 30, the camera apparatus 300 may hold the screen or determine whether to play the content image.

In addition, when the segmented image 141 as shown in FIG. 7 described above is displayed on the display apparatus 10, the capturer 380 captures a screen with the segmented image 141 displayed, and the apparatus for proof of play 310 recognizes a specific pattern or a specific color included in the segmented image 141 from the camera image. Information about the segmented image 141 may be stored in advance in the storage 350.

The apparatus for proof of play 310 may extract a screen area by recognizing the specific pattern or the specific color included in the segmented image 141. Subsequently, when the capturer 380 delivers the camera image, the screen region may be extracted from the camera image and comparison of the pixel values described above with respect to the extracted screen region may be performed.

The extraction of the screen area may be performed when the display apparatus 10 and the camera apparatus 300 are installed, and it can be performed whenever the installation position of the camera apparatus 300 is changed. In addition, it is also possible to perform periodically even if the installation position of the camera apparatus 300 or the display apparatus 10 is not changed.

On the other hand, it is also possible to determine whether or not a predetermined content image is played on the predetermined display apparatus 10 at a predetermined time using the camera image captured by the camera apparatus 30. Hereinafter, it will be described in detail with reference to FIG. 17.

Figure 17:
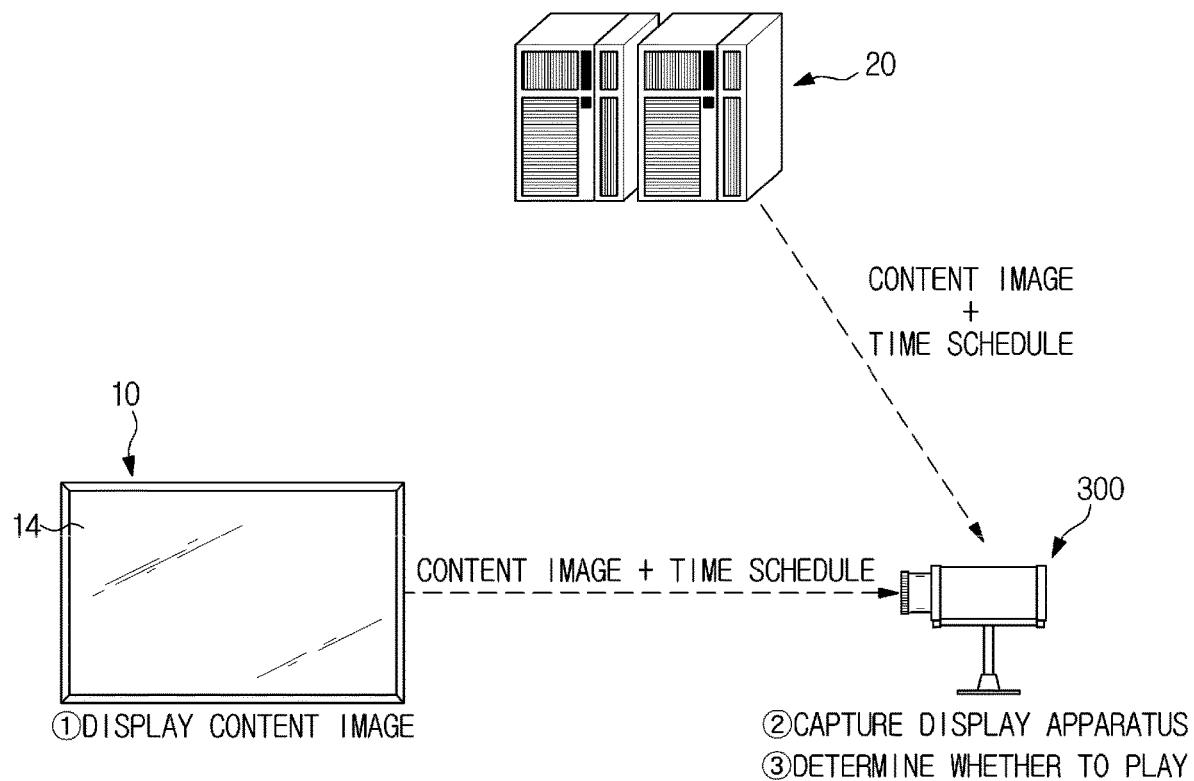
FIG. 17 is a diagram illustrating an example of comparing a content image scheduled to be played by a camera apparatus to a camera image according to an embodiment.

FIG. 17 is a diagram illustrating an example of comparing a content image scheduled to be played by a camera apparatus to a camera image according to an embodiment.

Referring to the example of FIG. 17, the display apparatus 10 ① displays a content image. The display apparatus 10 may play a predetermined content image at a predetermined time according to the stored time schedule.

The camera apparatus 300 ② captures the display apparatus 10. The camera apparatus 30 may photograph the play screen displayed on the display 14.

The camera apparatus 300 may automatically determine whether the predetermined content image is played at the predetermined time by comparing the camera image and the content image obtained by capturing the play screen of the display apparatus 100.

The camera apparatus 300 may receive the content image and the time schedule of the content image from the management server 20 or the display apparatus 10. When a plurality of the content images determined to be played on the display apparatus 10 captured by the camera apparatus 300 are provided, the plurality of content images may be provided together with the respective time schedules. The storage 350 may store the provided information non-transitory or temporarily.

The apparatus for proof of play 310 searches for the content image having the time schedule corresponding to the shooting time of the camera image in the storage 350. It is possible to determine whether to play the corresponding content image by comparing the searched content image with the camera image. The detailed description for determining whether to play the content image is as described in the above-described embodiment.

It is also possible that the operation of the apparatuses for proof of play 110, 210, and 310 according to the above-described embodiment is performed in the user terminal 40. In this case, the apparatus for proof of play that performs the operations of the apparatuses for proof of play 110, 210, and 310 described above may be stored in a recording medium provided in an external server, and the user terminal 40 may download and install a play determination program from the external server.

Hereinafter, a method for determining content play according to an embodiment will be described. The content play determination method according to an embodiment may be executed by at least one of the display apparatus 100, the management server 200, and the camera apparatus 300 according to the above-described embodiment. Accordingly, the above description of FIGS. 1 to 17 may be applied to a method for determining content play according to an embodiment even if there is no special mention.

Figure 18:
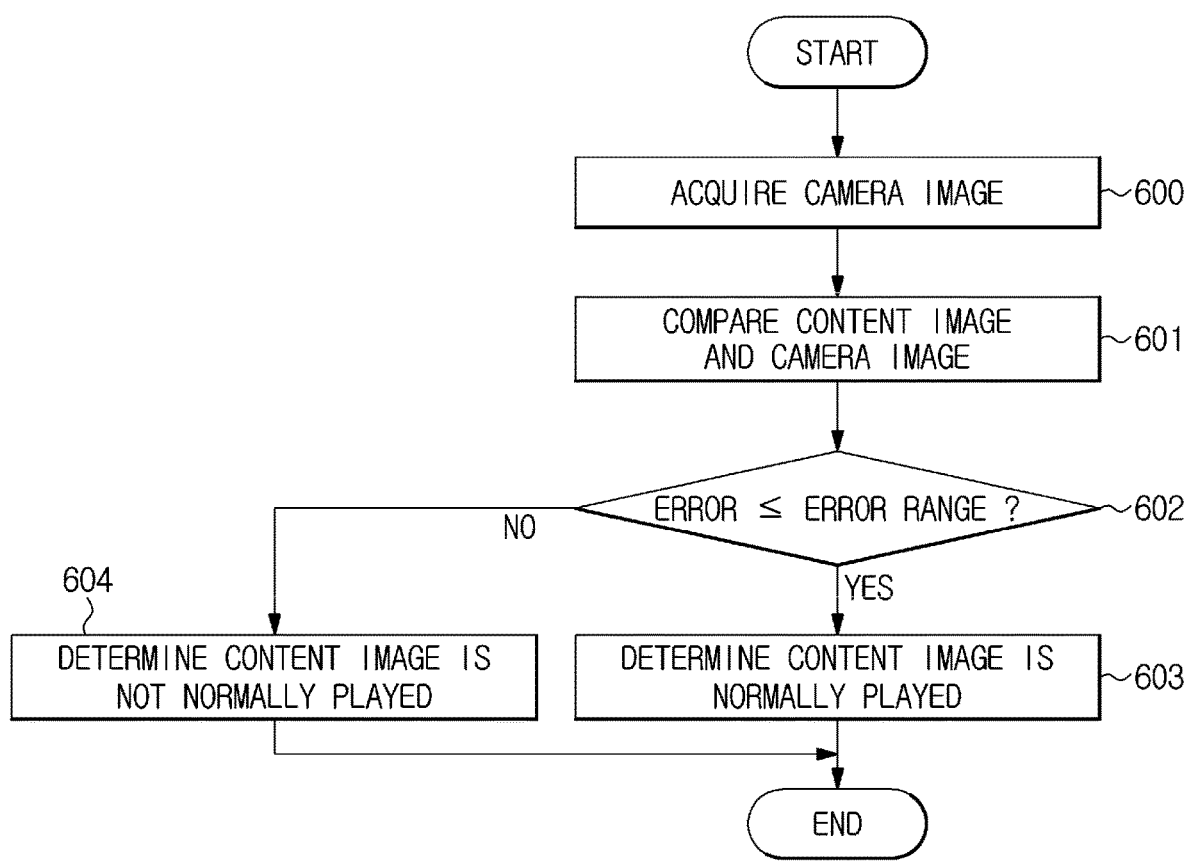
FIG. 18 is a flowchart of a method for proof of play of contents according to an embodiment.

FIG. 18 is a flowchart of a method for proof of play of contents according to an embodiment.

Referring to FIG. 18, a camera image is acquired (600). The camera image is an image captured by the camera apparatuses 30 and 300 installed toward the screens of the display apparatuses 10 and 100. When the method for proof of play of contents according to the embodiment is performed by the display apparatus 100 or the management server 200, it can be obtained by receiving the camera image from the camera apparatus 30, or when performing in the camera apparatus 300, the capturer 380 of the camera apparatus 300 may acquire the camera image by capturing the screen of the display apparatus 10.

In capturing the camera image, the display apparatus 10 or 100 may transmit information such as a V-sync signal, a network delay time, a frame interval, and a display processing time to the camera apparatuses 30 and 300, and the camera apparatus 30 may synchronize the screen output of the display apparatus 10 based on the transmitted information to capture the camera image.

The content image and the camera image are compared (601). The content images may be provided from the display apparatuses 10 and 100 or the management servers 20 and 200. The pixel value of the content image can be compared with the pixel value of the camera image, and the content image currently being played on the display apparatuses 10 and 100 and the camera image captured by the current camera apparatuses 30 and 300 may be compared.

Alternatively, it is also possible to compare the content image determined to be played at the capturing time of the camera image with the camera image.

If an error between the content image and the camera image is within a predetermined error range (YES in 602), it is determined that the content image is played (603), and if it is not within the error range (NO in 602), it may be determined (604) that the content image is not played.

When the content image is a video, the apparatuses for proof of play 110, 210, and 310 may compare the pixel values as described above every frame, and it can also be performed for each frame at regular time intervals.

When the pixel values are compared for a plurality of frames constituting one content image, it may be determined that the corresponding content image is played only when the comparison results for all frames are included in the error range. When a comparison result for a frame having a predetermined ratio or more is included in the error range, it may be determined that the corresponding content image is played.

A result of determining whether to play the content image is transmitted (605). When the determination of whether to play the content image is performed on the display apparatus 100 or the camera apparatus 300, the communicators 130 and 330 may transmit the result of determining whether to play to the management server 20 or the user terminal 40, and when executed in the management server 200, the communicator 230 may transmit the result of determining whether to play to the user terminal 40.

Meanwhile, a case in which the bezel 101 of the display apparatuses 10 and 100 is included in addition to the play screen may occur in the capturing area of the camera apparatuses 30 and 300.

Therefore, the display apparatus 100 may display the segmented image 141 for distinguishing the play screen from the bezel 101 before playing the content image. The description of the segmented image 141 is as described in FIG. 7. When the display apparatuses 10 and 100 display the segmented image 141, the camera apparatuses 30 and 300 capture the display apparatuses 10 and 100. The apparatuses for proof of play 110, 210, and 310 recognize specific patterns or colors included in the segmented image 141 from the camera image, and the screen area can be extracted from the camera image. After that, the content image is played on the display apparatuses 10 and 100, and when the camera apparatuses 30 and 300 capture the play screen, the apparatuses for proof of play 110, 210, and 310 may extract a screen area from the camera image and compare the pixel values with respect to the extracted screen area.

Figure 19:
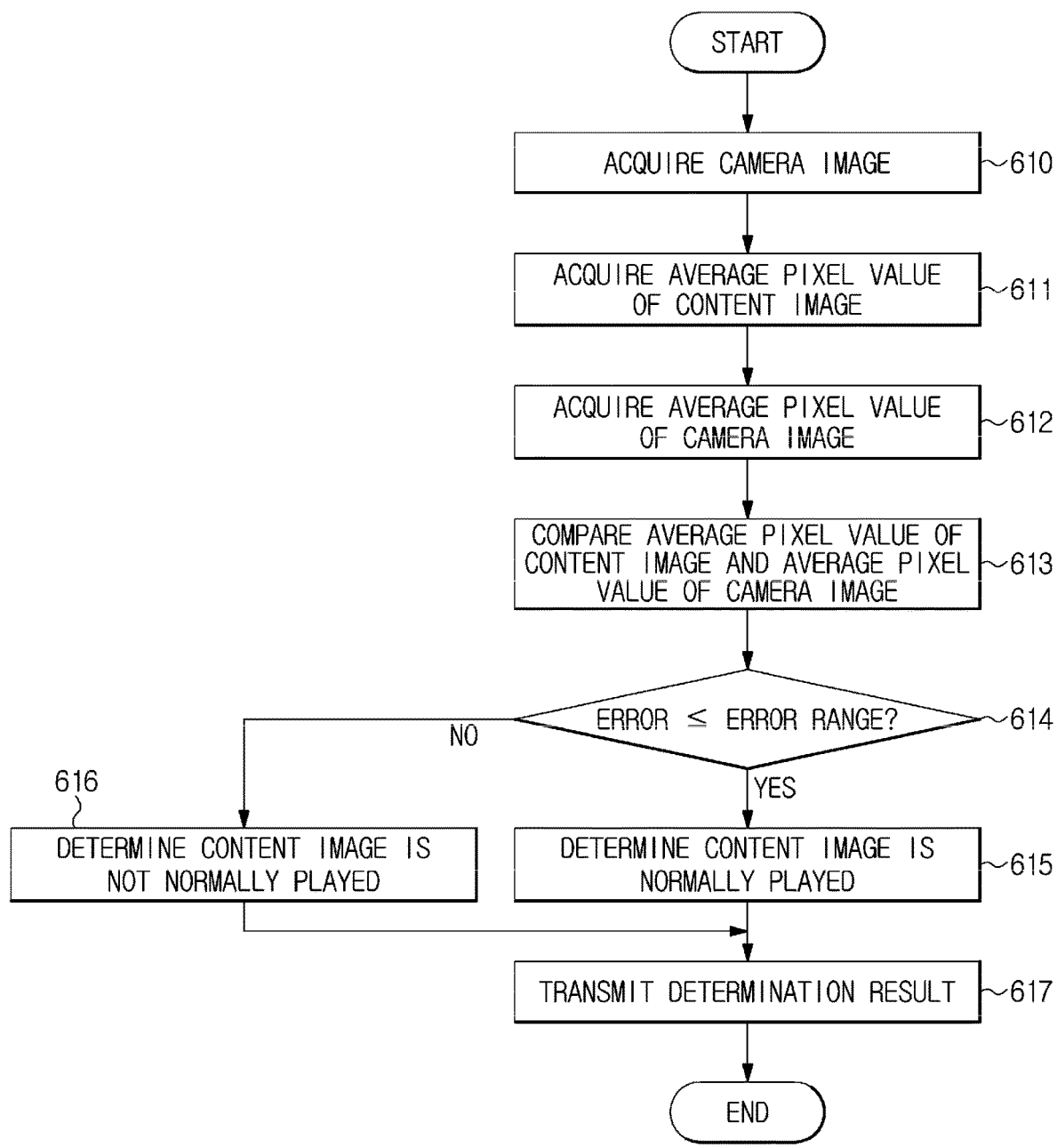
FIG. 19 is a flowchart illustrating an operation of comparing a content image and a camera image in a method for proof of play of contents according to an embodiment.

FIG. 19 is a flowchart illustrating an operation of comparing a content image and a camera image in a method for proof of play of contents according to an embodiment.

Referring to FIG. 19, a camera image is acquired (610). As described above, when the content play determination method according to the embodiment is performed by the display apparatus 100 or the management server 200, it can be obtained by receiving the camera image from the camera apparatus 30. When performing in the camera apparatus 300, the capturer 380 of the camera apparatus 300 may acquire the camera image by photographing the screen of the display apparatus 10.

An average of pixel values of the content image is acquired (611), an average of pixel values of the camera image is obtained (612). There is no limitation in the order of calculation of the average of the pixel values of the content image and the average of the pixel values of the camera image. It is also possible that both values are calculated simultaneously. As illustrated in FIG. 6, the apparatuses for proof of play 110, 210, and 310 may calculate an average of color values (pixel values) of mxn (=k) total pixels constituting the content image, and the average of the color values of all pixels can be calculated for the camera image in the same way.

Comparing the pixel value average of the content image and the pixel value average of the camera image (613), if the error of the two means is within a predetermined error range (YES in 614), it is determined that the content image has been played (615). If it is not within the error range (NO in 614), it is determined that the content image has not been played (616). At this time, the apparatuses for proof of play 110, 210, and 310 may compare the content image currently being played on the display apparatuses 10 and 100 with the camera image captured by the current camera apparatuses 30 and 300.

Alternatively, the content image having a play time corresponding to the shooting time of the camera image may be compared with the camera image.

A result of determining whether to play the content image is transmitted (617). When the determination of whether to play the content image is performed in the display apparatus 100 or the camera apparatus 300, the communicators 130 and 330 may transmit the result of determining whether to play to the management server 20 or the user terminal 40, and when executed on the management server 200, the communicator 230 may transmit the result of determining whether to play to the user terminal 40.

On the other hand, when the external light sensor 171 is provided on the display apparatuses 10 and 100 to measure external light around the display apparatuses 10 and 100, the apparatuses for proof of play 110, 210, and 310 affect the external light in the camera image. The external light can be removed and compared with the content image.

The external light sensor 171 may include the color sensor. When the external light sensor 171 outputs the color value of the external light, the apparatuses for proof of play 110, 210, and 310 subtract the color value of the external light from the camera image or sum the color values of the external light on the content image. The influence of the external light reflected in the comparison can be eliminated. Alternatively, it is also possible to remove the influence of the external light in such a way that the display apparatuses 10 and 100 lower and output the pixel value of the content image displayed on the displays 14 and 140 by the color value of the measured external light.

In addition, the display apparatuses 10 and 100 may also include the proximity sensor 172 for detecting an obstacle between the display apparatuses 10 and 100 and the camera apparatuses 30 and 300.

When the proximity sensor 172 detects an obstacle, an obstacle detection signal is transmitted to the apparatuses for proof of play 110, 210, and 310. When the obstacle detection signal is transmitted, the apparatuses for proof of play 110, 210, and 310 may suspend determination of play through comparison of the camera image and the content image. Alternatively, an obstacle detection signal is transmitted to the camera apparatuses 30 and 300, and it is also possible to hold the play screen.

According to the above-described embodiment, the camera device may compare the camera image and the content image obtained by capturing the screen of the display apparatus, and automatically determine whether the content image is played normally. As a result, it is possible to reduce the cost and increase the accuracy of judgment as compared to the case where the determination of play is performed manually, and to reduce the time required for the determination.

In addition, it may be determined whether the content image is played on a predetermined display apparatus at a predetermined time. Accordingly, it is possible to provide a convenient and accurate play verification method to the advertiser who requested to play the content video.

The invention claimed is:

1. A display apparatus comprising:
    a display configured to display a content image;
    a communicator configured to receive a camera image capturing the display; and
    a controller configured to compare the content image and the camera image using a pixel value of the content image and a pixel value of the camera image, and determine whether the content image is displayed normally on the display based on a result of the comparison,
    wherein the controller is further configured to:
        control the display to display a segmented image for distinguishing a screen from a bezel,
        recognize a segmented image from the camera image; and
        determine a screen area based on the recognized segmented image.

2. The display apparatus of claim 1, wherein the controller is further configured to obtain an average pixel value of the content image and an average pixel value of the camera image, and determine whether the content image is displayed normally on the display by comparing the average pixel value of the content image and the average pixel value of the camera image.

3. The display apparatus of claim 2, wherein the controller is further configured to determine the content image is displayed normally on the display based on an error between the average pixel value of the content image and the average pixel value of the camera image being within a predetermined error range.

4. The display apparatus of claim 1, wherein the pixel value is determined by a color space applied to the content image.

5. The display apparatus of claim 1, wherein the controller is further configured to control the communicator to transmit at least one of information including a vertical synchronization signal, a network delay time, a frame interval, and a display processing time to a camera device capturing the camera image.

6. The display apparatus of claim 1, wherein the controller is further configured to compare the content image displayed on the display with the received camera image in real time.

7. The display apparatus of claim 1 further comprising:
    an external light sensor configured to measure external light around the display apparatus,
    wherein the controller is further configured to remove the measured external light from the camera image, and compare the camera image from which the measured external light is removed and the content image.

8. The display apparatus of claim 1 further comprising:
    a proximity sensor configured to detect an obstacle between the display apparatus and a camera device that captures the camera image.

9. The display apparatus of claim 1 further comprising:
    a memory configured to store the camera image when the camera image capturing the screen displayed content image and the content image are input;
    a processor configured to compare the pixel value of the content image and the pixel value of the camera image using the pixel value of the camera image, and determine the content image is displayed normally based on result of the comparison.

10. The display apparatus of claim 9, wherein the processor is configured to acquire an average of pixel values of the content image and an average of pixel values of the camera image, and determine whether the content image is displayed normally by comparing the average of the pixel values of the content image and the average of the pixel values of the camera image.

11. A method for proof of play of contents comprising:
    acquiring a camera image capturing a screen of a display that is displaying a content image;
    comparing the content image and the camera image using a pixel value of the content image and a pixel value of the camera image;
    determining whether the content image is displayed normally based on result of the comparing,
    controlling the display to display a segmented image for distinguishing the screen from a bezel;
    recognizing a segmented image from the camera image; and
    determining a screen area based on the recognized segmented image.

12. The method of claim 11, wherein the comparing the content image and the camera image comprises:
    obtaining an average pixel value of the content image and an average pixel value of the camera image, and comparing the average pixel value of the content image and the average pixel value of the camera image.

13. The method of claim 12, wherein the determining whether the content image is displayed normally comprises:
    determining the content image is displayed normally on the display based on an error between the average pixel value of the content image and the average pixel value of the camera image being within a predetermined error range.

14. The method of claim 11, wherein the comparing the content image and the camera image using the pixel value of the content image and the pixel value of the camera image comprises:
    removing the measured external light from the camera image, and comparing the camera image from which the measured external light is removed and the content image.

* * * * *